US011961689B2

(12) United States Patent
Shirilla et al.

(10) Patent No.: US 11,961,689 B2
(45) Date of Patent: Apr. 16, 2024

(54) LOAD BREAK TOOL HAVING ROTATIONAL FLEXIBILITY

(71) Applicant: Utility Solutions, Inc., Hickory, NC (US)

(72) Inventors: Peter Shirilla, Hickory, NC (US); Eugene H. Wood, Hickory, NC (US); Matthew Nolte, Hickory, NC (US); Jonathon S. Spencer, Catawba, NC (US); Thomas Beane, Hudson, NC (US); Zachary Greer, Hickory, NC (US)

(73) Assignee: Utility Solutions, Inc., Hickory, NC (US)

( * ) Notice: Subject to any disclaimer, the term of this patent is extended or adjusted under 35 U.S.C. 154(b) by 0 days.

(21) Appl. No.: 17/856,028

(22) Filed: Jul. 1, 2022

(65) Prior Publication Data

US 2023/0009698 A1 Jan. 12, 2023

Related U.S. Application Data

(60) Provisional application No. 63/219,061, filed on Jul. 7, 2021.

(51) Int. Cl.
*H01H 71/02* (2006.01)
*H01H 71/10* (2006.01)

(52) U.S. Cl.
CPC .......... *H01H 71/10* (2013.01); *H01H 71/025* (2013.01)

(58) Field of Classification Search
CPC .... H01H 71/10; H01H 71/025; H01H 71/122; H01H 31/127; H01H 31/12; H01H 31/122; H01H 31/125; H01H 31/006; H01H 31/121; H01H 85/0208; H01H 33/04; H01H 33/12; H01H 9/30
USPC ...... 200/52 R, 17 R, 50.1, 114, 146; 218/12, 218/11, 45, 48, 84
See application file for complete search history.

(56) References Cited

U.S. PATENT DOCUMENTS 2,922,864 A * 1/1960 Lindell ................ H01H 31/006 200/554
2,985,737 A * 5/1961 Mikos .................. H01H 31/006 337/156
3,032,630 A * 5/1962 McCloud ............. H01H 31/006 337/156
3,320,377 A * 5/1967 Yonkers ................... H01H 1/42 200/48 R
4,700,028 A * 10/1987 Heyde .................. H01H 33/121 218/8
5,650,602 A * 7/1997 Wood ................... H01H 31/006 200/17 R
5,742,220 A * 4/1998 Scherer .............. H01H 85/0208 337/171

(Continued)

*Primary Examiner* — William A Bolton
(74) *Attorney, Agent, or Firm* — Trego, Hines & Ladenheim PLLC; Brandon C. Trego; Jonathan M. Hines

(57) ABSTRACT

A load break tool is disclosed. The load break tool includes a main housing; a sleeve having a first end and a second end coaxially mounted in the main housing and slidable between a retracted position and an extended position, wherein the second end of the sleeve remains in the main housing in the extended position; a clip assembly connected to the main housing for engaging a pull ring of a circuit isolating device; and a hook engaging terminal rotatably connected to the first end of the sleeve, such that the hook engaging terminal rotates relative to the clip assembly.

18 Claims, 23 Drawing Sheets

(56) References Cited

U.S. PATENT DOCUMENTS

| | | | | | |
|---|---|---|---|---|---|
| 6,078,008 | A * | 6/2000 | Wood | H01H 31/00 | |
| | | | | 174/45 R | |
| 6,300,585 | B1 * | 10/2001 | Nicolai | H01H 1/0015 | |
| | | | | 218/43 | |
| 10,679,815 | B1 * | 6/2020 | Lynch | H01H 85/185 | |
| 10,978,262 | B2 * | 4/2021 | Browne | H01R 11/14 | |

* cited by examiner

LOAD BREAK TOOL HAVING ROTATIONAL FLEXIBILITY

BACKGROUND OF THE INVENTION

The present invention relates to a load break tool, and more particularly to a load break tool for medium- and high-voltage electrical circuit isolating devices.

Circuit isolating devices such as fuse cutouts, disconnecting switches, and power fuses are adapted to be periodically opened to provide necessary service, such as for fuse replacement or service to electric power lines. Conventionally, such circuit isolating devices include a ring-like conducting part and a hook-like conducting part which are relatively movable between a contacting position to establish a closed circuit through the device and a separated position to establish an open circuit.

When it is necessary to open the circuit isolating device when it is carrying load current, an arc is drawn between the two conducting parts, which is likely to damage any components which are contacted by the arc. Also, where other adjacent circuits are involved, there is a risk that the drawn arc may jump to another circuit, causing a fault in the other circuit. Still further, there is a risk that the drawn arc can jump to an operator, causing injury.

To minimize the risks and dangers associated with the opening of such circuit isolating devices, load break tools are commercially available. This typically comprises a first terminal which engages the ring-like conducting part of the isolating device and a second terminal which engages the hook-like conducting part. The load break tool is mounted at the upper end of an elongated line pole.

In use, the operator engages the two terminals of the interrupting apparatus with the two conducting parts of the circuit isolating device. Upon then pulling downwardly on the line pole, the operator is able to separate the two conducting parts of the isolating device to open the circuit so that the current then flows through a shunt circuit which is located in the interior of the interrupting apparatus. The load break tool further has a shunt circuit interrupter which opens the shunt circuit inside the load break tool so that the resulting arc is confined to the interior of the tool.

One problem with existing load break tools it that the operator is sometimes unable to quickly and easily reach a position required to release the tool without binding or catching on some cutouts or switches.

BRIEF SUMMARY OF THE INVENTION

This problem is addressed by a load break tool that provides rotational flexibility.

According to one aspect of the invention, a load break tool includes a main housing; a sleeve having a first end and a second end coaxially mounted in the main housing and slidable between a retracted position and an extended position, wherein the second end of the sleeve remains in the main housing in the extended position; a clip assembly connected to the main housing for engaging a pull ring of a circuit isolating device; and a hook engaging terminal rotatably connected to the first end of the sleeve, such that the hook engaging terminal rotates relative to the clip assembly.

According to another aspect of the invention, a load break tool includes a tubular main housing extending between a first end and a second end; a sleeve having a first end and a second end, the sleeve being coaxially mounted in the main housing and slidable between a retracted position and an extended position, wherein the second end of the sleeve remains in the main housing proximate the first end of the main housing when in the extended position; a clip assembly connected to the main housing and including a clip post for engaging a pull ring of a circuit isolating device; and a hook engaging terminal rotatably connected to the first end of the sleeve, such that the hook engaging terminal rotates relative to the clip assembly, the hook engaging terminal including a hub, first and second arms extending outwardly from the hub, and an arcuate portion pivotally connected between the first and second arms.

According to another aspect of the invention, a load break tool includes a tubular main housing extending between a first end and a second end; a sleeve having a first end and a second end, the sleeve being coaxially mounted in the main housing and slidable between a retracted position and an extended position; a clip assembly connected to the main housing and including a clip post for engaging a pull ring of a circuit isolating device; a hook engaging terminal rotatably connected to the sleeve, such that the hook engaging terminal rotates relative to the clip assembly, the hook engaging terminal including a hub having an interior bore, first and second arms extending outwardly from the hub, and an arcuate portion pivotally connected between the first and second arms; and a hub mount connected to the first end of the sleeve, the hub being rotatably connected to the hub mount such that a cylindrical portion of the hub mount is positioned inside of the interior bore of the hub.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 2:
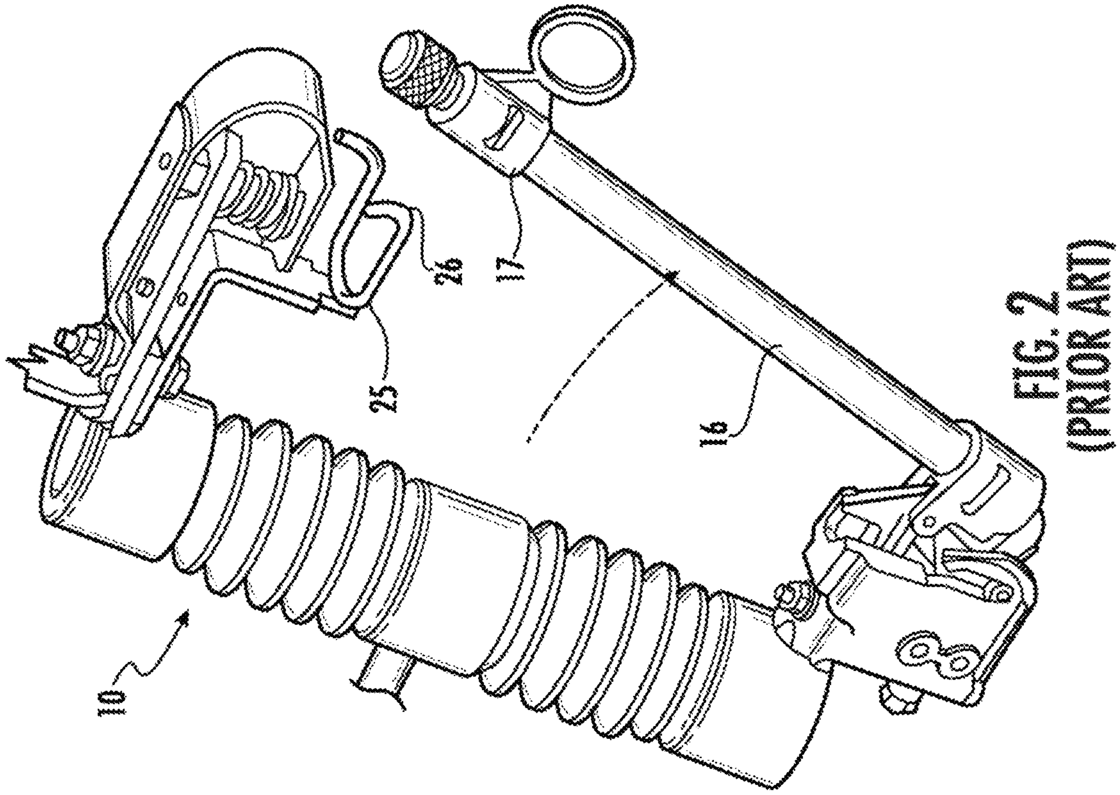
FIG. 2 (PRIOR ART)
FIG. 2 is a perspective view of the circuit isolating device of FIG. 1 in an open position.
Figure 1:
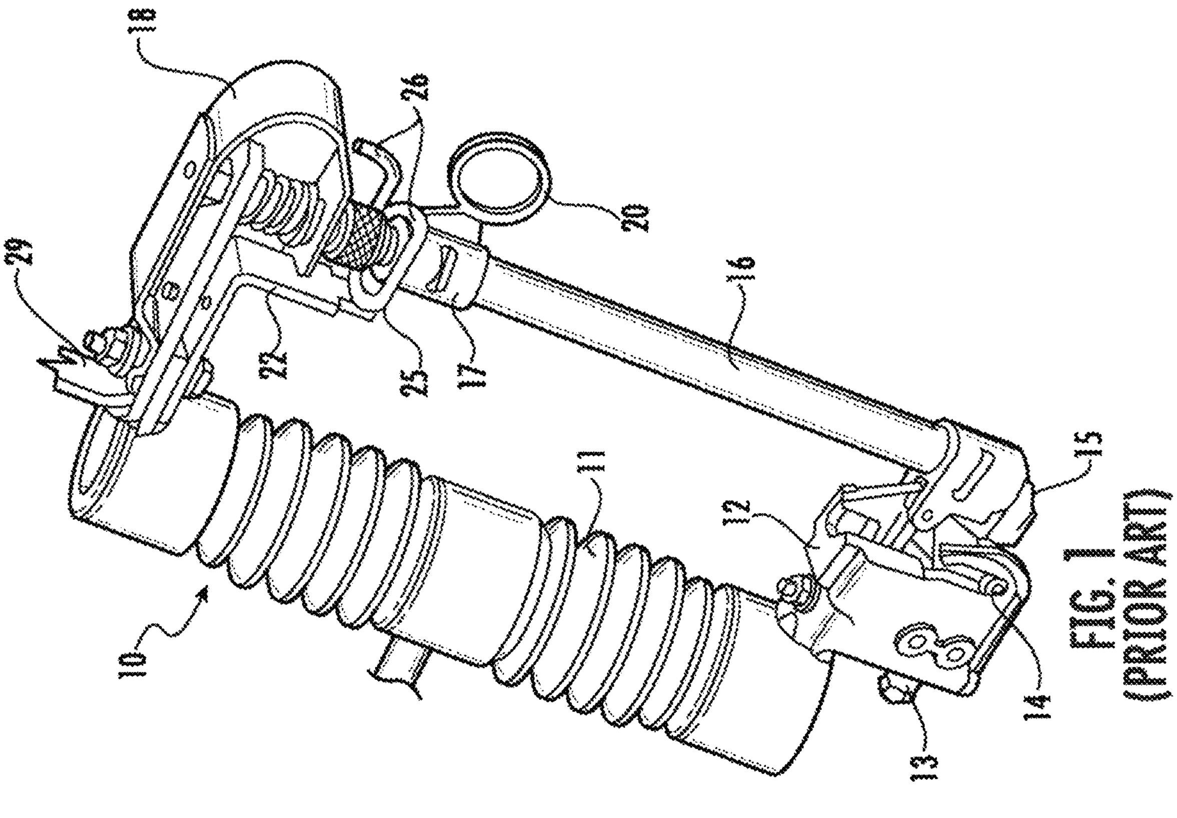
FIG. 1 (PRIOR ART)
FIG. 1 is a perspective view of a circuit isolating device in a closed position.

Referring to the drawings wherein identical reference numerals denote the same elements throughout the various views, FIGS. 1 and 2 illustrate a conventional circuit isolating device 10 of the disconnecting fuse type. The circuit isolating device 10 typically includes an insulator 11 which is arranged to be mounted on a utility pole cross arm or the like and has a lower terminal contact member 12 carrying a connector 13 for connection to a line terminal. Pivoted at 14 on the lower terminal contact member is a lower current carrying member 15 that is positioned at the lower end of a fuse tube 16. At its upper end, the fuse tube 16 has an upper current carrying member 17 which is positioned in contact engagement with a normally energized terminal contact member 18 carried by the upper end of the insulator 11. In order to remove the upper current carrying member 17 from contact engagement with the terminal contact member 18, the former is provided with a ring-like conducting part 20 also referred to as a “pull ring”. The terminal contact member 18 includes an L-shaped reinforcing bar 22 having a downwardly extending arm which carries a hook-like conducting part 25 also referred so as an “arcing horn”. The part 25 is shaped, in part, for guiding the upper current carrying member 17 into proper contact engagement with the terminal contact member 18. The part 25 includes forwardly extending arms 26 at the outer ends of which are transversely extending horns or studs. Provisions are also made for connecting an energized line conductor (not shown) to the terminal contact 18 and the bar 22 through a terminal pad 29.

FIG. 1 illustrates the circuit isolating device 10 in a closed or contacting position in which there is electrical continuity between the terminal contact member 18 and the connector 13, through the fuse tube 16. FIG. 2 illustrates the circuit isolating device 10 in an open or separated position in which there is an open circuit (i.e., no electrically continuity) between the terminal contact member 18 and the connector 13.

FIGS. 3-9 illustrate an exemplary portable load break tool 32 for use in opening a circuit isolating device 10 while it is carrying line current.

The load break tool 32 includes a tubular main housing 34 extending along a longitudinal axis “A” between a first end 36 and a second end 38. The load break tool 32 also includes a sleeve 40 that is coaxially mounted within the main housing 34 so as to be slidable between a retracted position (FIG. 3) and an extended position (FIG. 4).

Figure 18:
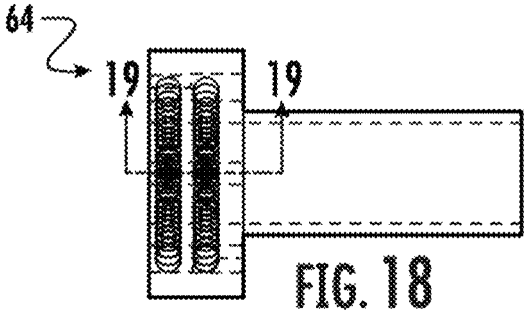
FIG. 18 is a schematic side view of an alternative hook loop assembly having two springs arranged in two layers.
Figure 19:
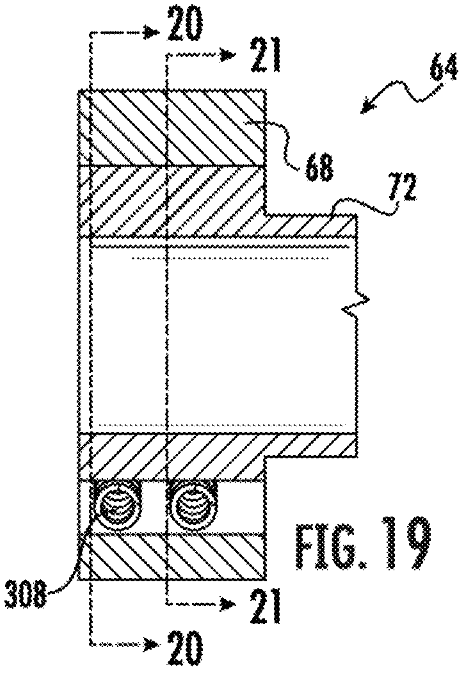
FIG. 19 is a view taken along lines 19-19 of FIG. 18.

A housing element referred to as a “can” 44 surrounds and is attached to the main housing 34. A clip assembly 46 is mounted to the can 44. The clip assembly 46 includes a body 48 extending between a proximal end 50 and a distal end 52. The proximal end 50 is coupled to the can 44. The proximal end 50 also includes a pole mount 54 by which a line pole 56 (FIG. 18) can be fixed thereto. A conductive clip post 58 is mounted at the distal end of the body 48, extending roughly perpendicular to axis A. A spring-loaded pivoting follower 60 is mounted to the body 48; its tip rides in a groove in the clip post 58. A capture latch 62 is also mounted to the body 48, via a latch post 63. The capture latch 62 is pivotable about the long axis of the latch post 63 and in a plane parallel to the movement of the follower 60. The capture latch 62 is spring-loaded towards the neutral, closed position shown in FIG. 4. It will be understood that the clip assembly 46 is configured to engage the pull ring 20 of the circuit isolating device 10 by pressing the capture latch 62 against the pull ring 20. The capture latch 62 is also configured to release the pull ring 20 in response to being moved in a lateral direction.

The purpose of the clip assembly 46 and in particular the clip post 58 is to provide a means for making electrical contact with the pull ring 20 of the circuit isolating device 10. The clip post 58, or in the entire clip assembly 46, can be easily removed and replaced with a terminal having a different size or configuration, so as to best engage the particular isolating device 10 being serviced.

The load break tool 32 also includes a hook engaging terminal, referred to as a “hook loop” 64, in the form of a closed ring-like member or eye, which is mounted to the sleeve 40. In the illustrated example, the hook loop 64 comprises a pair of rigid arms 66 extending outwardly from an annular hub 68 and an outer arcuate portion 70 which is mounted for pivotal movement between the rigid arms 66, about an axis “P” which can be substantially perpendicular to but spaced from the longitudinal axis A of the main housing 34. In the illustrated example, the hub 68 is connected to a hub mount 72 which is in turn connected to the sleeve 40.

The load break tool 32 further includes an internal shunting circuit assembly 74 (shown schematically) connected between the clip assembly 46 and the hook loop 64. When the sleeve 40 is in the retracted position (FIG. 3), the shunting circuit assembly 74 forms part of a continuous electrically conductive path from the clip assembly 46 to the hook loop 64. The shunting circuit assembly 74 is further operable to interrupt that electrically conductive path in response to the sleeve 40 being moved to and reaching its extended position (FIG. 4). Shunting circuit assemblies 74 of this type are known in the prior art.

The load break tool 32 includes an internal latch mechanism coupled to a reset control such as a button or plunger. In this example embodiment, the plunger is on the backside of the can 44 and is thus not visible in FIGS. 3 and 4. In response to a user pulling the sleeve 40 to the extended position, the internal latch mechanism is operable to lock the sleeve 40 in the extended position as shown in FIG. 5. The internal shunting circuit assembly 74 springs to the open position when the sleeve 40 is locked extended. User operation of the reset control actuates the internal latch mechanism, allowing the sleeve 40 to fall back down under its own weight to its retracted position, which is shown in FIG. 4. When the sleeve 40 falls back down it then reconnects the internal circuit.

In order to facilitate use of the load break tool 32, in particular to aid the user in releasing the load break tool 32 from the circuit isolating device 10, the load break tool 32 may be provided with some means of relative rotation between the hook loop 64 in the clip assembly 46. Generally, this relative rotation would be about the longitudinal axis A, or an axis which is parallel thereto. A restoring force such as one or more springs may be provided to urge the relatively rotating parts towards a default or "home" position. This feature may be referred to as "rotational flexibility".

In an exemplary embodiment shown in FIGS. 3-9, the hook loop 64 is rotatable relative to the remainder of the components of the load break tool 32. More specifically, the hub mount 72 is rigidly attached to the sleeve 40, and the hub 68 is rotatably mounted to the hub mount 72.

Figure 3:
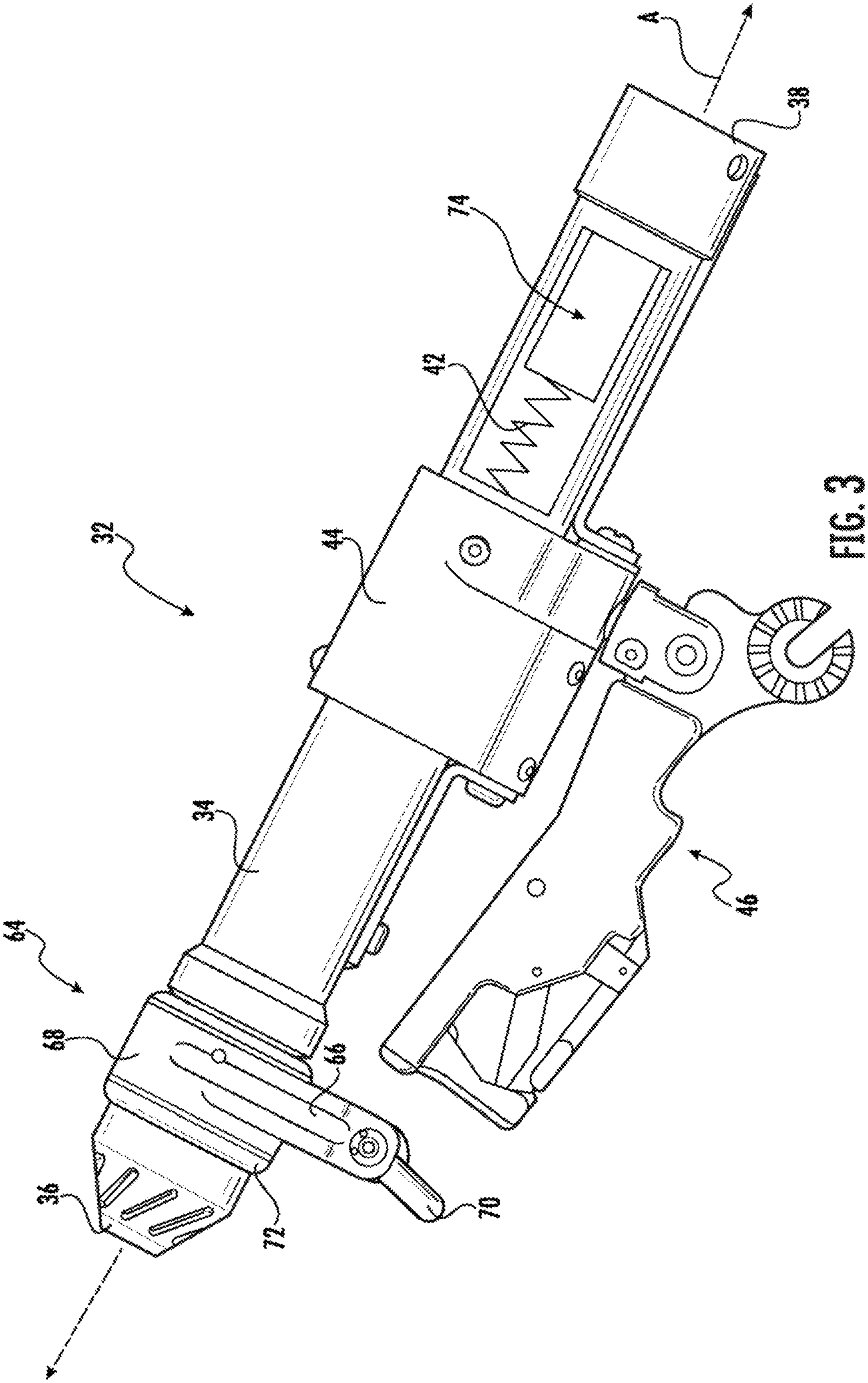
FIG. 3 is a partially cut away side view of an exemplary load break tool in a closed position, with a hook loop thereof in a home position.
Figure 4:
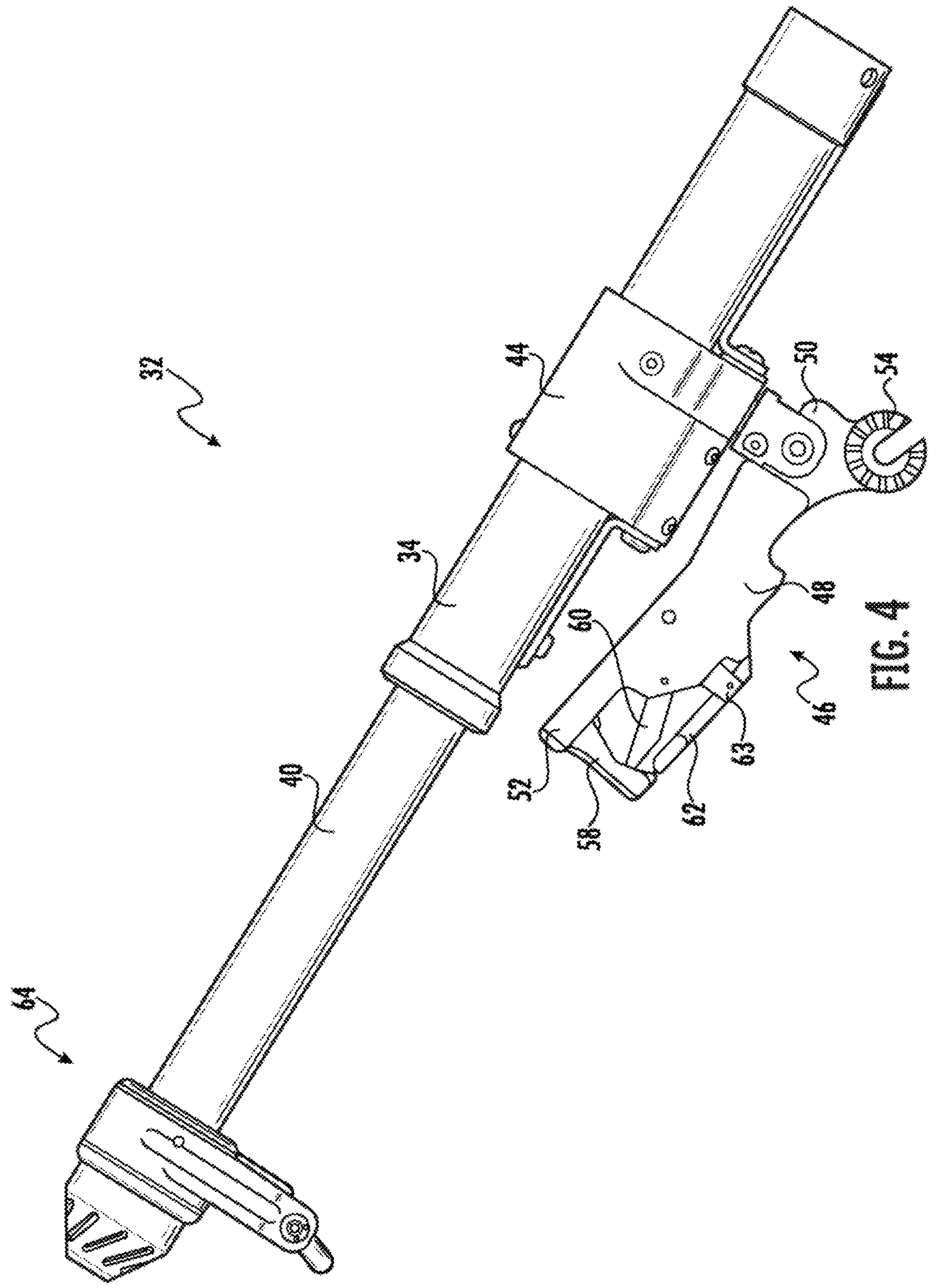
FIG. 4 is a side view of the load break tool of FIG. 3, in an open position.
Figure 5:
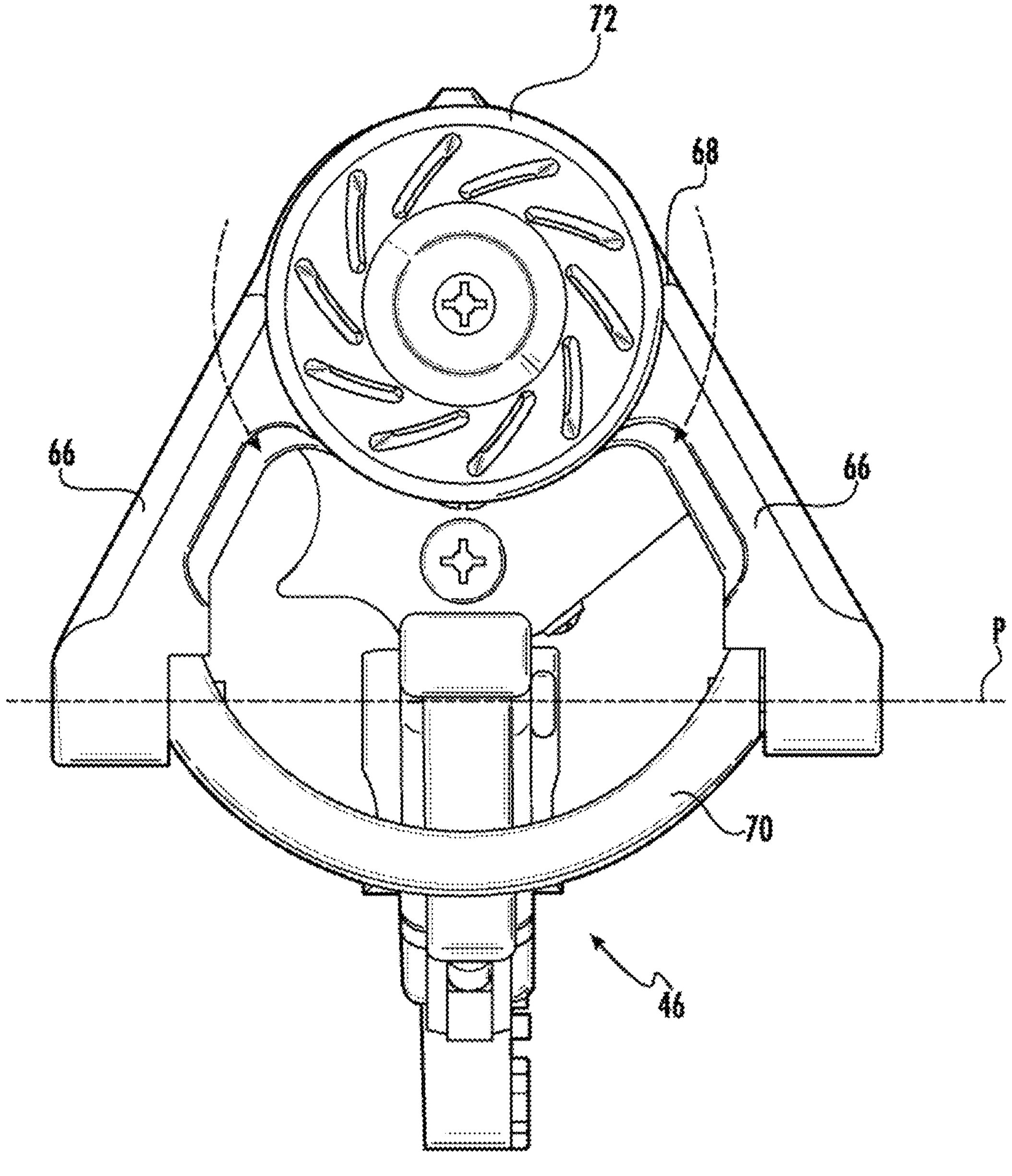
FIG. 5 is an end view of the hook loop of FIG. 3.

FIGS. 3-5 show the hook loop 64 in a neutral or home position. In the home position, a midpoint of the outer arcuate portion 70 is generally aligned with the middle of the clip assembly 46.

Figure 6:
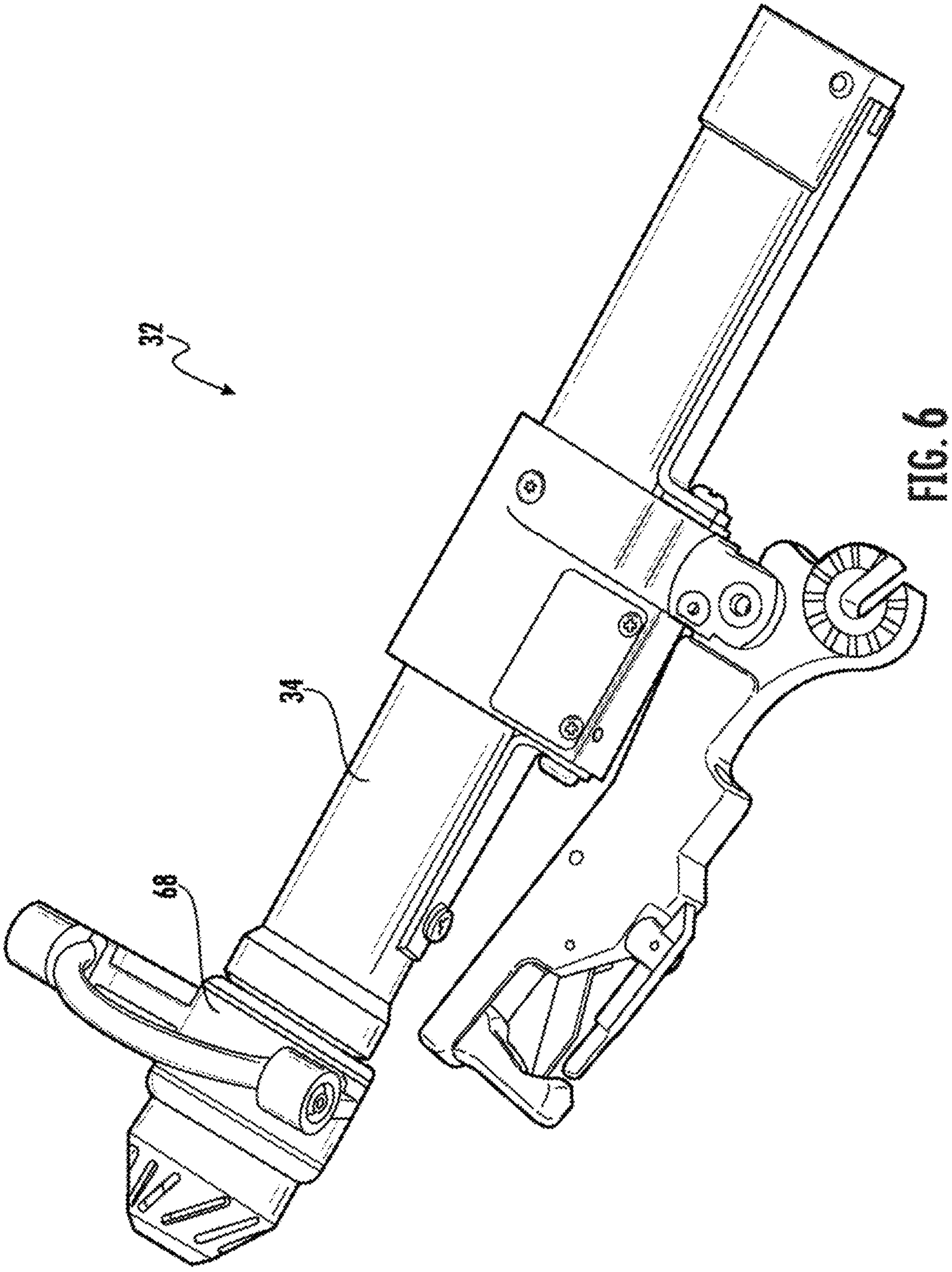
FIG. 6 is a side view of an exemplary load break tool in a closed position, with a hook loop thereof rotated in a first direction away from the home position.
Figure 7:
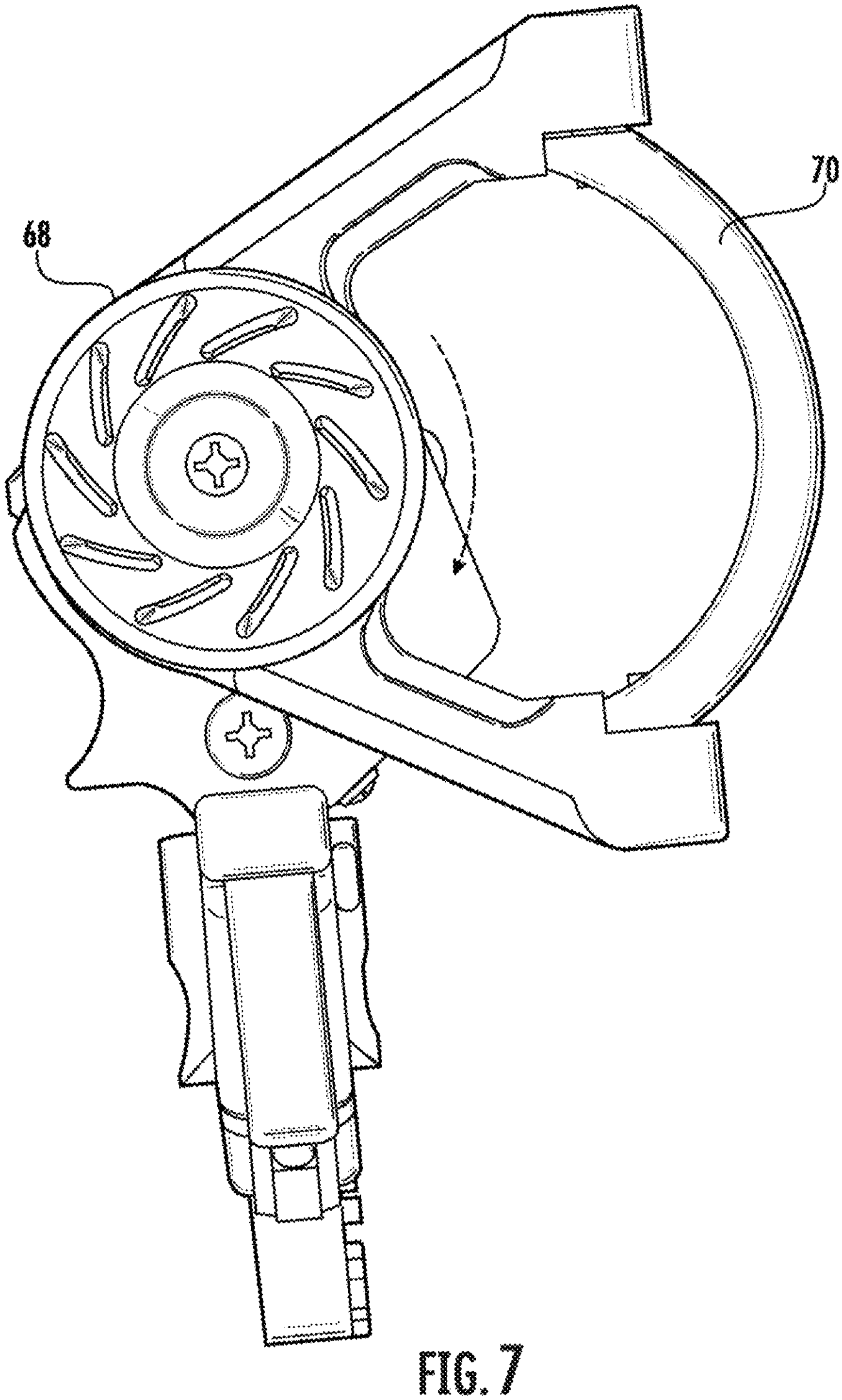
FIG. 7 is an end view of the hook loop of FIG. 6.

FIGS. 6 and 7 show the hook loop 64 in a position rotated counter-clockwise away from the home position. As will be described further below, it is rotated in this position by a user applying pressure to the load break tool 32 during use. A spring element applies a restoring force in the clockwise direction is shown by the arrow in FIG. 7. In this example, the hook loop 64 is rotated to the limits of its possible movement, in this example approximately 90 degrees. A mechanical stop internal to the hub 68 or the hub mount 72 (not shown) may be provided to limit movement to the desired position.

Figure 8:
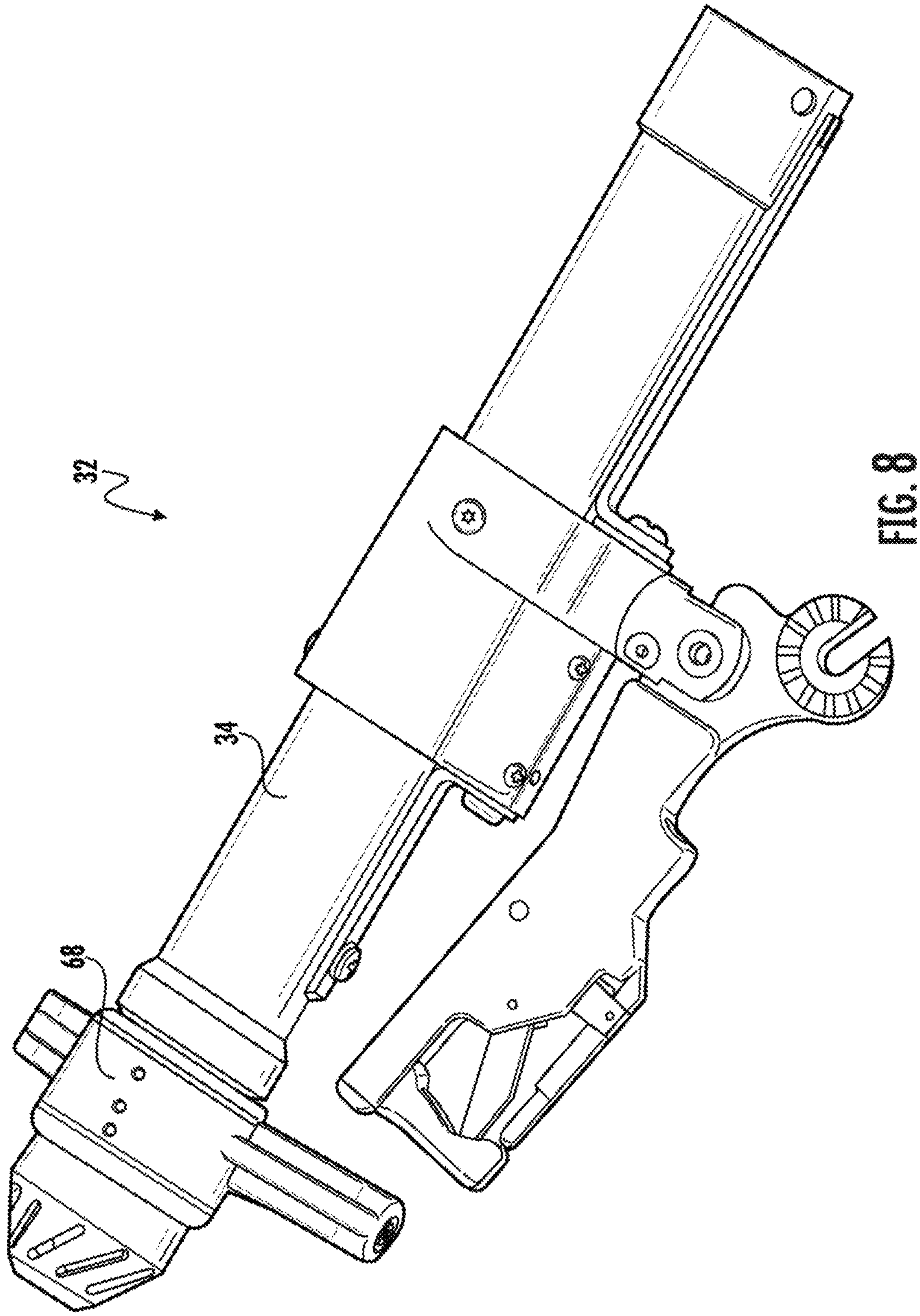
FIG. 8 is a side view of an exemplary load break tool in a closed position, with a hook loop thereof rotated in a second direction away from the home position.
Figure 9:
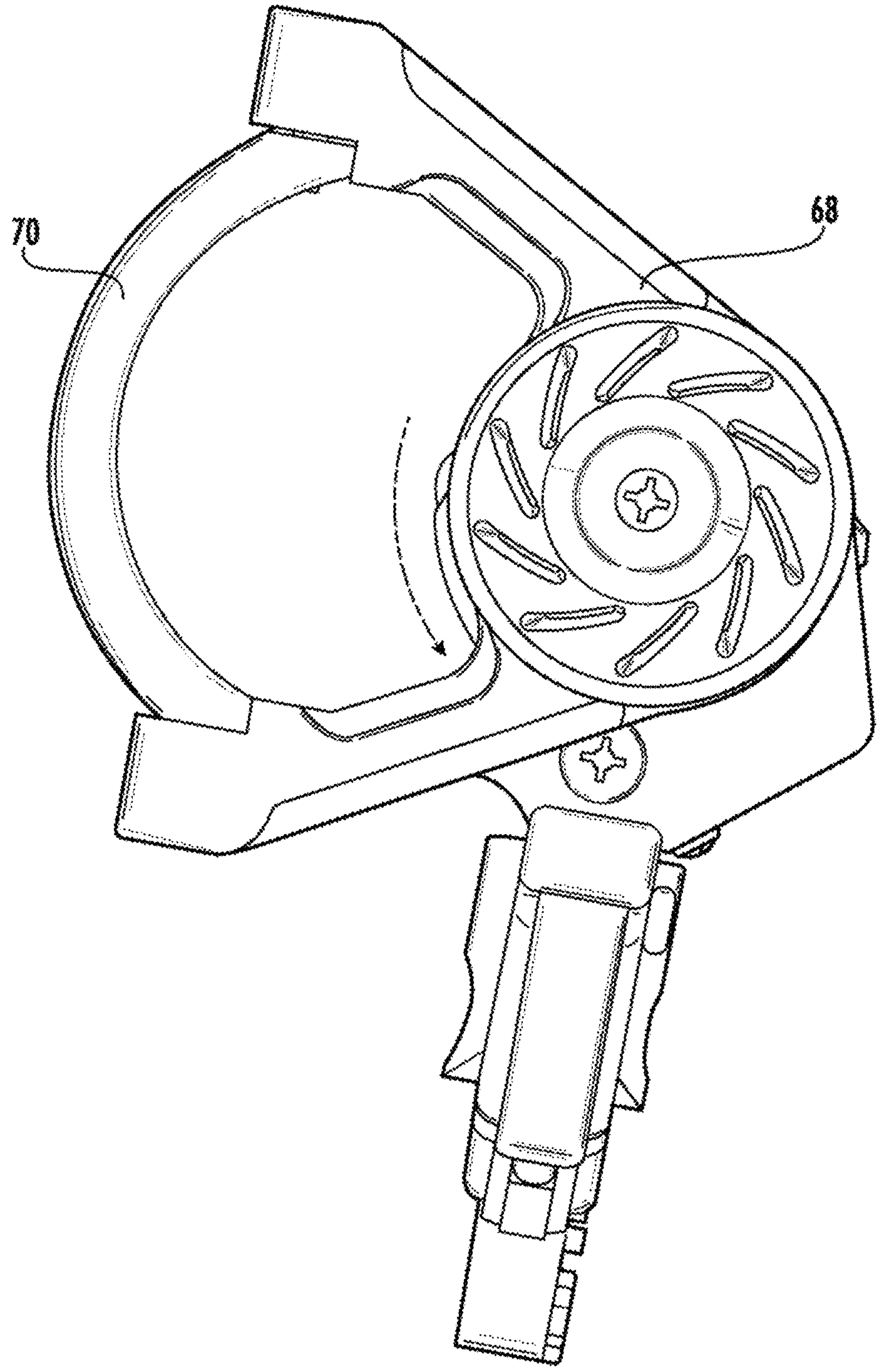
FIG. 9 is an end view of the hook loop of FIG. 8.

FIGS. 8 and 9 show the hook loop 64 in a position rotated clockwise away from the home position. As will be described further below, it is rotated in this position by a user applying pressure to the load break tool 32 during use. A spring element applies a restoring force in the counter-clockwise direction is shown by the arrow in FIG. 9. In this example, the hook loop 64 is rotated to the limits of its possible movement, in this example approximately 90 degrees. A mechanical stop internal to the hub 68 or the hub mount 72 (not shown) may be provided to limit movement to the desired position.

In the example embodiment shown in FIGS. 6-9, the hook loop 64 is provided with a total of 180 degrees of total travel. Optionally, another range of movement to be provided so long as the hook mount 64 is spring-loaded towards the home position. For example, the total range of movement could be more or less than 180 degrees, or the location of the home position could be asymmetric relative to the limits of movement.

Numerous physical configurations are possible for enabling spring-loaded rotation of the hook loop 64. Several examples are discussed with reference to FIGS. 10-17.

Figure 10:
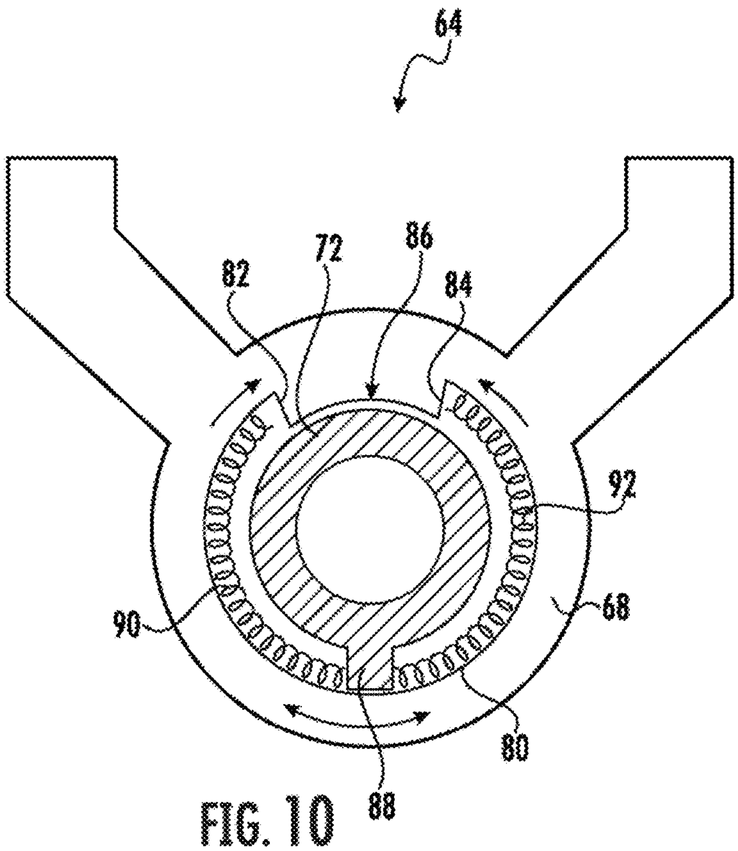
FIG. 10 is a schematic sectional view of a hook loop assembly having two springs arranged in a single layer, in a home position.
Figure 11:
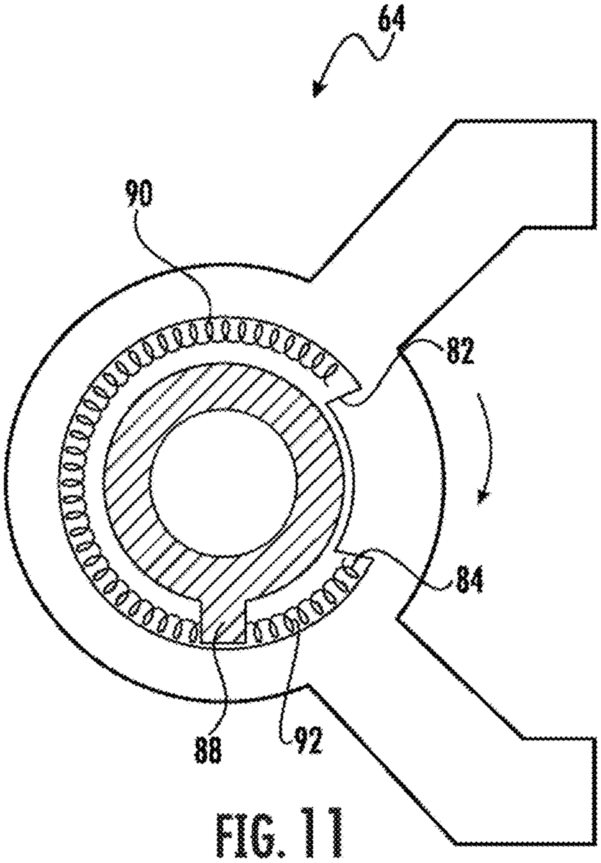
FIG. 11 is a schematic sectional view of the hook loop assembly of FIG. 10, in a rotated position.

FIGS. 10 and 11 illustrate a portion of a hook loop 64 including a hub 68 and hub mount 72 having two springs arranged in a single layer. The hub 68 includes an interior bore 80 defining a first spring seat 82 and a second spring seat 84. The two spring seats 82, 84 are spaced apart from each other in the circumferential direction, but they lie roughly in the same plane in the height direction of the hub 68, i.e., parallel to longitudinal axis A of the load break tool 32. The hub mount 72 includes a cylindrical portion 86 with a spring stop 88, positioned inside the interior bore 80. A first spring 90 extends between the first spring seat 82 and the spring stop 88. A second spring 92 extends between the second spring seat 84 and the spring stop 88. Various types of springs may be used, such as compression springs, tension springs, coil springs, or leaf springs. FIG. 10 depicts the hook loop 64 in the home position, where the first and second springs 90, 92 are deflected an equal amount.

FIG. 11 depicts the hook loop 64 with the hub 68 rotated clockwise relative to the hub mount 72. They can be seen that the first spring 90 is extended and the second spring 92 is compressed. In this position, the deflected springs 90, 92 will provide a restoring force towards the home position when external pressure is released.

Figure 12:
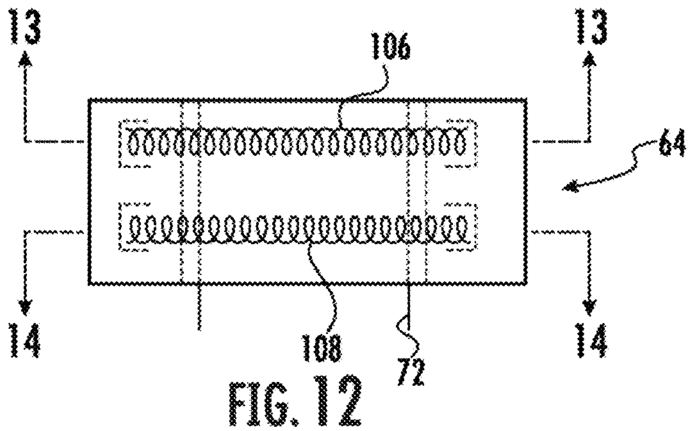
FIG. 12 is a schematic side view of a hook loop assembly having two springs arranged in two layers.
Figure 13:
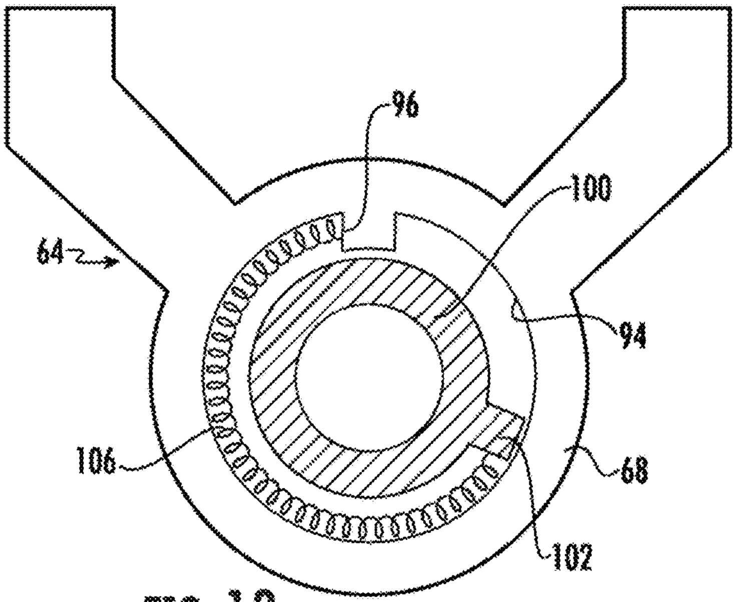
FIG. 13 is a view taken along lines 13-13 of FIG. 12.
Figure 14:
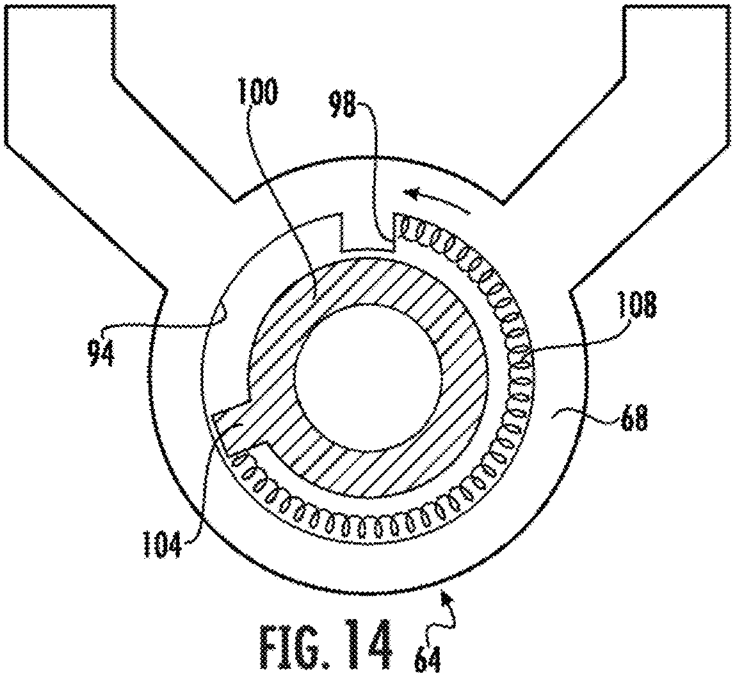
FIG. 14 is a view taken along lines 14-14 of FIG. 12.

FIGS. 12-14 illustrate a portion of a hook loop 64 including a hub 68 and hub mount 72 having two springs arranged in two layers. The hub 68 includes an interior bore 94 defining a first spring seat 96 and a second spring seat 98. The two spring seats 96, 98 lie in different planes in the height direction of the hub 68, i.e., parallel to longitudinal axis A of the load break tool 32. The hub mount 72 includes a cylindrical portion 100 positioned inside the interior bore 94. The cylindrical portion 100 includes a first spring stop 102 and a second spring stop 104. The two spring stops 102, 104 lie in different planes in the height direction of the hub 68. A first spring 106 extends between the first spring seat 96 and the first spring stop 102. A second spring 108 extends between the second spring seat 98 and the second spring stop 104.

In the illustrated example, compression springs are used. Accordingly, the first spring 106 would provide a restoring force in the clockwise direction as shown by the arrow in FIG. 13, and the second spring 108 would provide a restoring force in the counterclockwise direction is shown by the arrow in FIG. 14. It will be understood that other types of springs such as tensile springs, coil springs, or leaf springs could be used. It will also be understood that the magnitude and direction of restoring force will depend not only on the basic type of spring but how specifically it is mounted within the hook loop 64.

Figure 15:
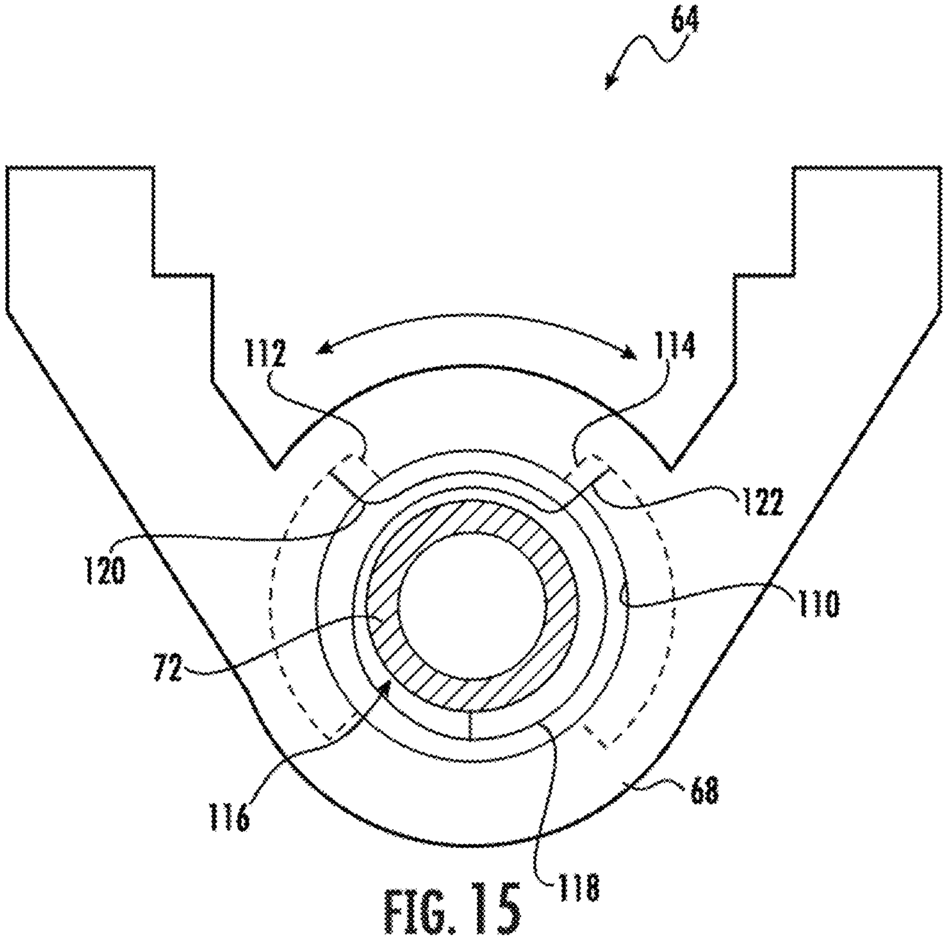
FIG. 15 is a schematic sectional view of a hook loop assembly having a dual acting torsion spring.

FIG. 15 illustrates a portion of a hook loop 64 including a hub 68 and hub mount 72 having a single, dual-acting torsion spring. The hub 68 includes an interior bore 110 defining a first spring seat 112 and a second spring seat 114. The two spring seats 112, 114 are spaced apart from each other in the circumferential direction. The hub mount 72 includes a cylindrical portion 116 positioned inside the interior bore 110. A torsion spring 118 is fixed to the cylindrical portion 116. It includes a first arm 120 extending between the first spring seat 112 and the cylindrical portion 116. The torsion spring 118 also includes a second arm 122 extending between the second spring seat 114 and the cylindrical portion 116. FIG. 15 illustrates the hub 68 in the home position. As shown by the arrow in FIG. 15, it can be seen that the torsion spring 118 will provide a restoring force either clockwise or counterclockwise, depending on how the hub 68 is rotated away from the home position.

Figure 16:
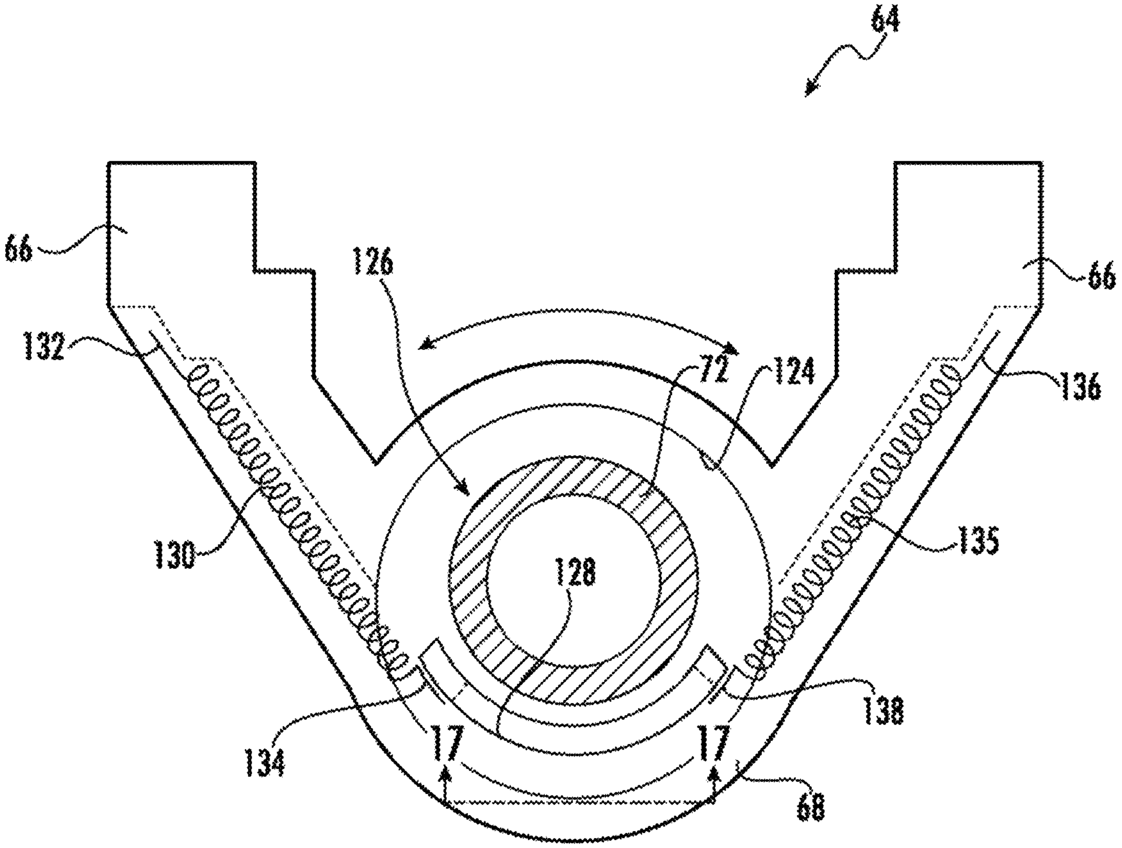
FIG. 16 is a schematic sectional view of a hook assembly having two springs arranged in a single layer and coupled to a spring carrier.
Figure 17:
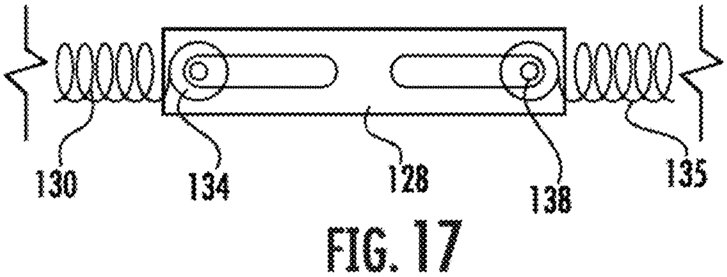
FIG. 17 is a view taken along lines 17-17 of FIG. 16.

FIGS. 16 and 17 illustrate a portion of a hook loop 64 including a hub 68 and hub mount 72 having two springs arranged in a single layer. The hub 68 includes an interior bore 124. The hub mount 72 includes a cylindrical portion 126 with a spring carrier 128, positioned inside the interior bore 124. A first spring 130 is disposed within one of the rigid arms 66 that extends outward from the hub 68. A first end 132 of the first spring 130 is connected to a distal end of the rigid arm 66, and a second end 134 of the first spring 130 is connected to the spring carrier 128.

A second spring 135 is disposed within one of the rigid arms 66 that extends outward from the hub 68. A first end 136 of the second spring 135 is connected to a distal end of the rigid arm 66, and a second end 138 of the second spring 135 is connected to the spring carrier 128. In the illustrated example, extension-type springs are used, although other types could be substituted. In this example, clockwise rotation of the hub 68 will extend the second spring 135, resulting in a counter-clockwise restoring force. Conversely, counterclockwise rotation of the hub 68 will extend the first spring 130, resulting in a clockwise restoring force. In the illustrated example, the springs 130, 134 are connected to the spring carrier 128 with slotted connections. This provides some dead band or free play such that when one spring is extended, the opposite spring is not compressed.

Figure 20:
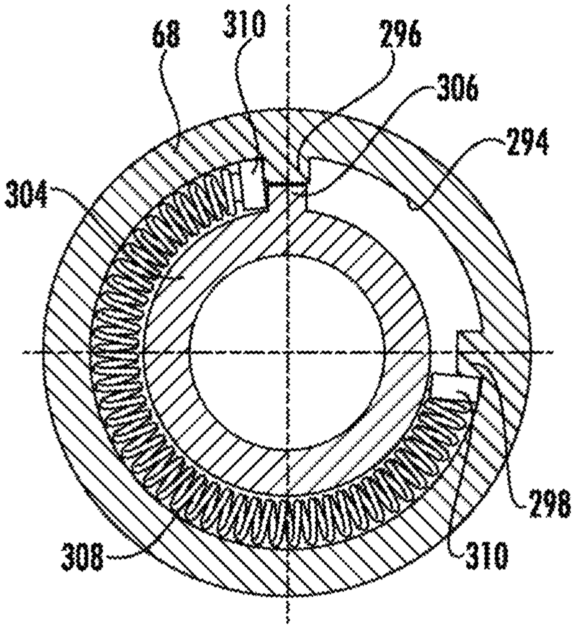
FIG. 20 is a view taken along lines 20-20 of FIG. 19.
Figure 21:
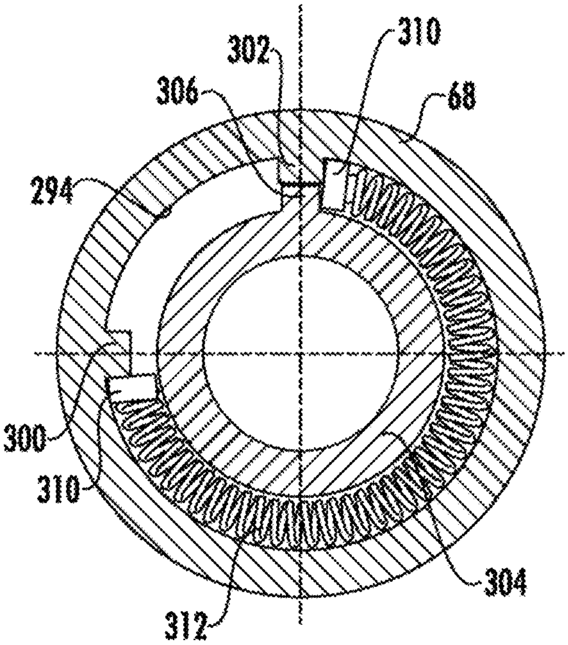
FIG. 21 is a view taken along lines 21-21 of FIG. 19.

Optionally, same type of springs is depicted in FIGS. 20 and 21 could be mounted to the exterior of the hub 68 instead of the interior.

FIGS. 18-21 illustrate a portion of a hook loop 64 including a hub 68 and hub mount 72 having two springs arranged in two layers. The hub 68 includes an interior bore 294. At a first axial location, the interior bore 294 defines a first spring seat 296 and a second spring seat 298. The two spring seats 296, 298 are spaced apart from each other in the circumferential direction. In the illustrated example, the first and second spring seats 296, 298 are spaced approximately 90 degrees apart. This specific angle is not critical. At a second axial location, the interior bore 294 defines a third spring seat 300 and a fourth spring seat 302. These two spring seats 300, 302 are spaced apart from each other in the circumferential direction. In the illustrated example, the third and fourth spring seats 300, 302 are spaced approximately 90° apart. The specific angle is not critical. The hub mount 72 includes a cylindrical portion 304 positioned inside the interior bore 294. The cylindrical portion 304 includes a spring stop 306. The maximum radial dimension of the spring stop 306 is selected to be less than the minimum radial dimension of the spring seats 296, 298, 300, 302. A first spring 308 extends between the first and second spring seats 296, 298. The ends of the first spring 308 are mounted over optional end plugs 310 which serve the purpose of preventing the spring coils from collapsing or being deformed. A second spring 312 extends between the third and fourth spring seats 300, 302. It may also be mounted over end plugs 310. The first spring 308 and the second spring 312 lie in different planes in the height direction of the hub 68, i.e. parallel to longitudinal axis A of the load break tool 32.

FIGS. 20 and 21 illustrate the first and second springs 308, 312 in the "home" position of the hub 68. It can be seen that neither of the springs is compressed, other than an optional small amount of preload for the purpose of preventing rattling.

Figure 22:
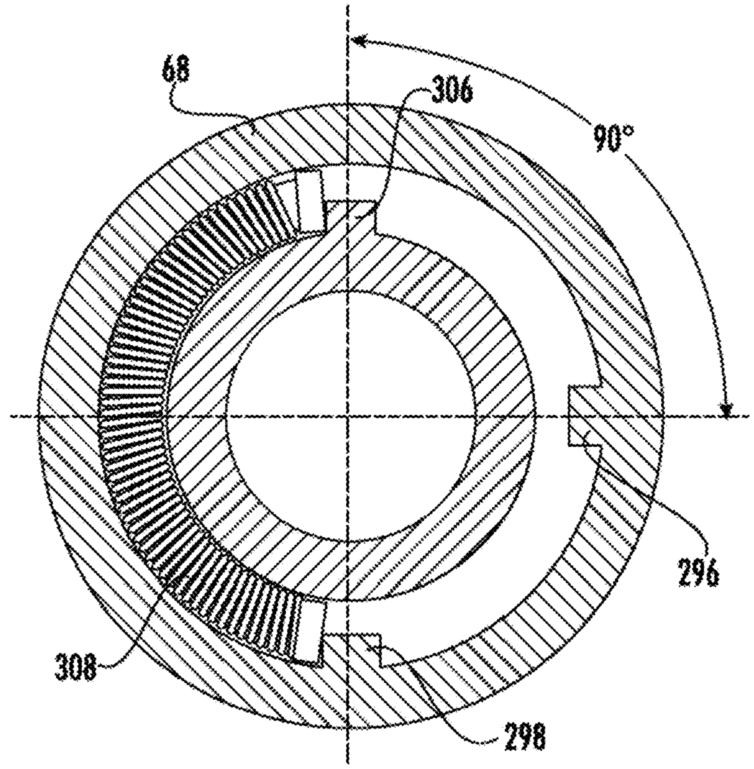
FIG. 22 is a cross-sectional view of a first portion of the hook loop assembly of FIG. 18, in a first rotated position.
Figure 23:
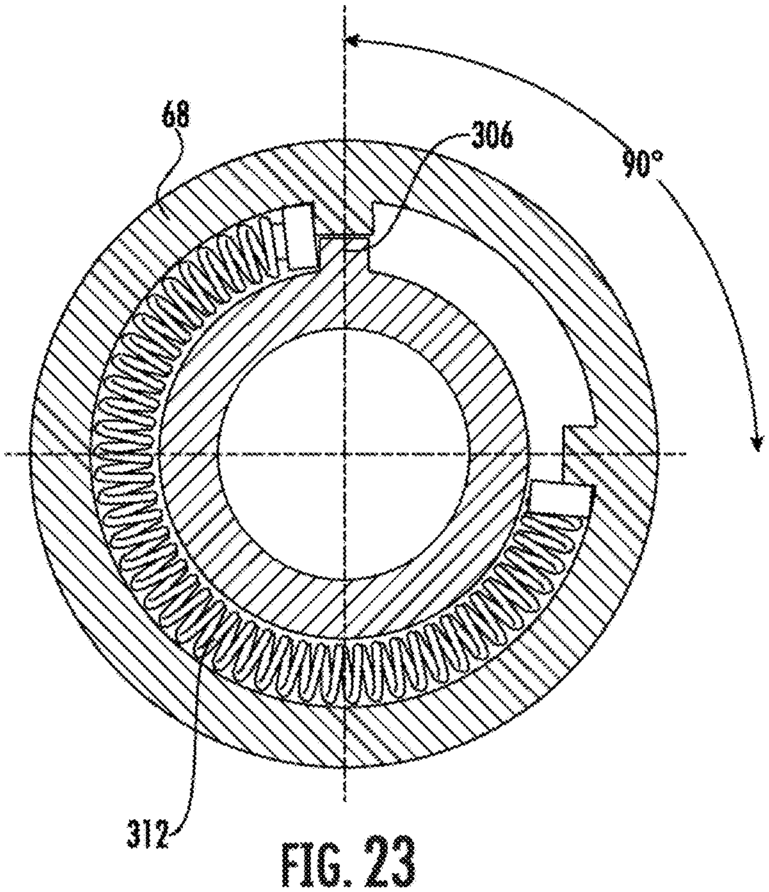
FIG. 23 is a cross-sectional view of a second portion of the hook loop assembly, in a first rotated position.

FIGS. 22 and 23 illustrate the hub 68 rotated approximately 90 degrees clockwise from the home position. It can be seen that the first spring 308 is compressed between the second spring seat 298 and the spring stop 306 (FIG. 20). The second spring 310 is not compressed.

Figure 24:
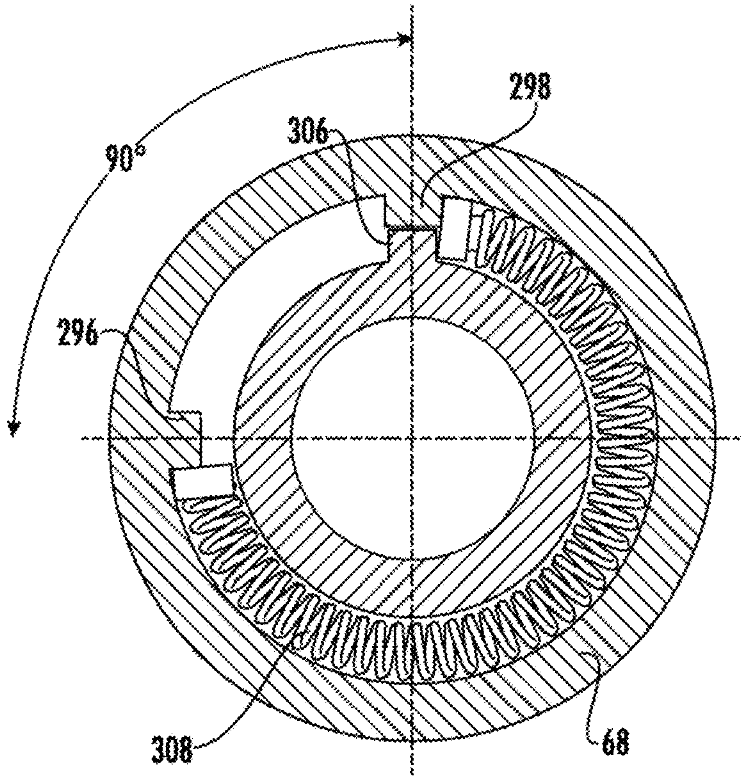
FIG. 24 is a cross-sectional view of a second portion of the hook loop assembly of FIG. 18, in a first rotated position.
Figure 25:
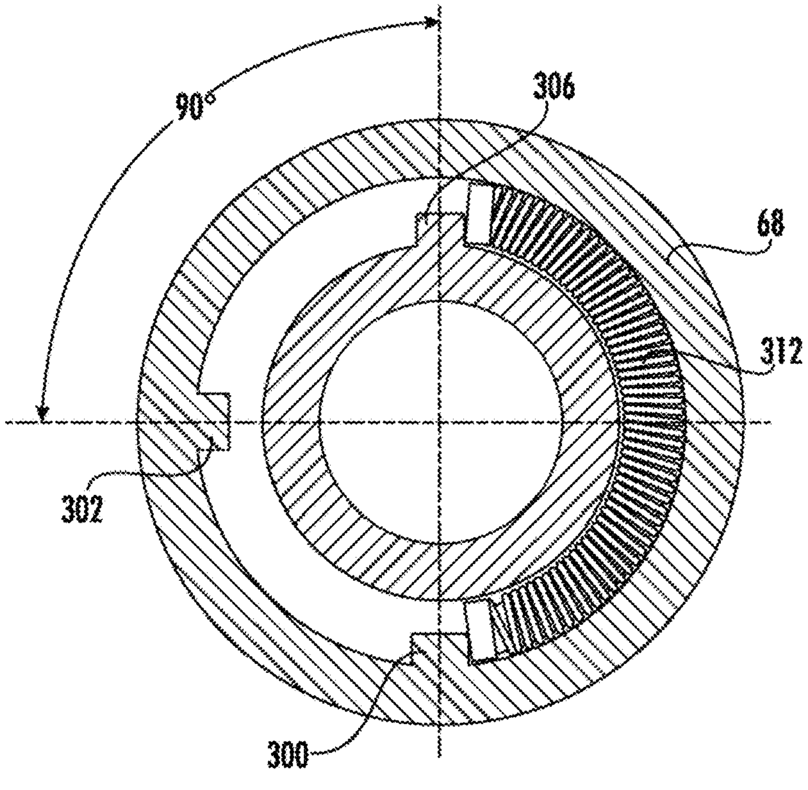
FIG. 25 is a cross-sectional view of a second portion of the hook loop assembly of FIG. 18, in a second rotated position.

FIGS. 24 and 25 illustrate the hub 68 rotated approximately 90° counterclockwise from the home position. It can be seen that the second spring 312 is compressed between the third spring seat 300 and the spring stop 306 (FIG. 25). The first spring 308 is not compressed.

Figure 26:
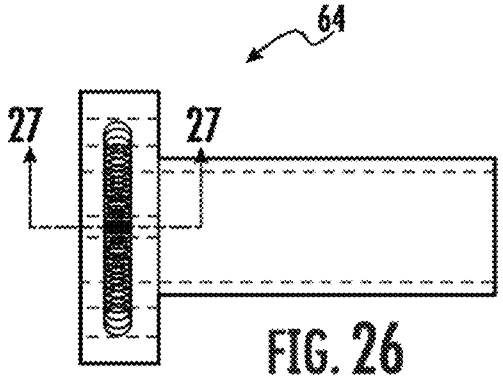
FIG. 26 is a schematic side view of an alternative hook loop assembly having a single spring.
Figure 27:
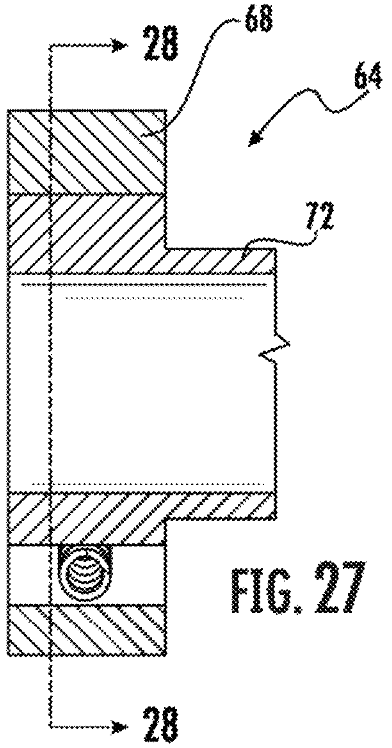
FIG. 27 is a view taken along lines 27-27 of FIG. 26.
Figure 28:
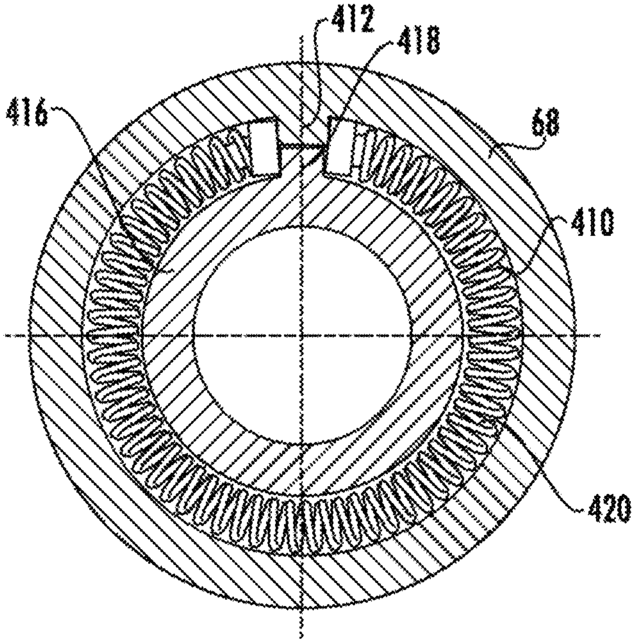
FIG. 28 is a view taken along lines 28-28 of FIG. 27.

FIGS. 26-30 illustrate a portion of a hook loop 64 including a hub 68 and hub mount 72 having a single compression spring. The hub 68 includes an interior bore 410 defining a single, double-sided, spring seat 412. The hub mount 72 includes a cylindrical portion 416 positioned inside the interior bore 410. The cylindrical portion 416 includes a spring stop 418. The maximum radial dimension of the spring stop 418 is selected to be less than the minimum radial dimension of the spring seat 412. A spring 420 extends in almost a complete circle, between opposing sides of the spring seat 412. FIGS. 26-28 illustrate the hub 68 in the home position. It can be seen that the spring 420 is not compressed, other than an optional small amount of preload for the purpose of preventing rattling.

Figure 29:
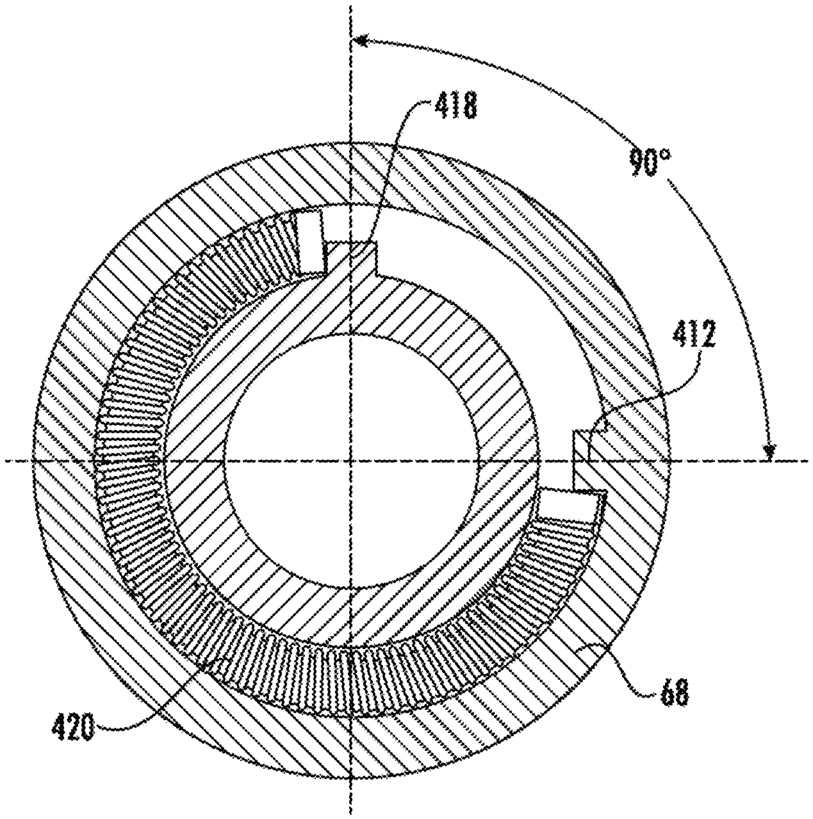
FIG. 29 is a cross-sectional view of the hook loop assembly of FIG. 26, in a first rotated position.

FIG. 29 illustrates the hub 68 rotated approximately 90 degrees clockwise from the home position. It can be seen that the spring 420 is compressed between one side of the spring seat 412 and the spring stop 418.

Figure 30:
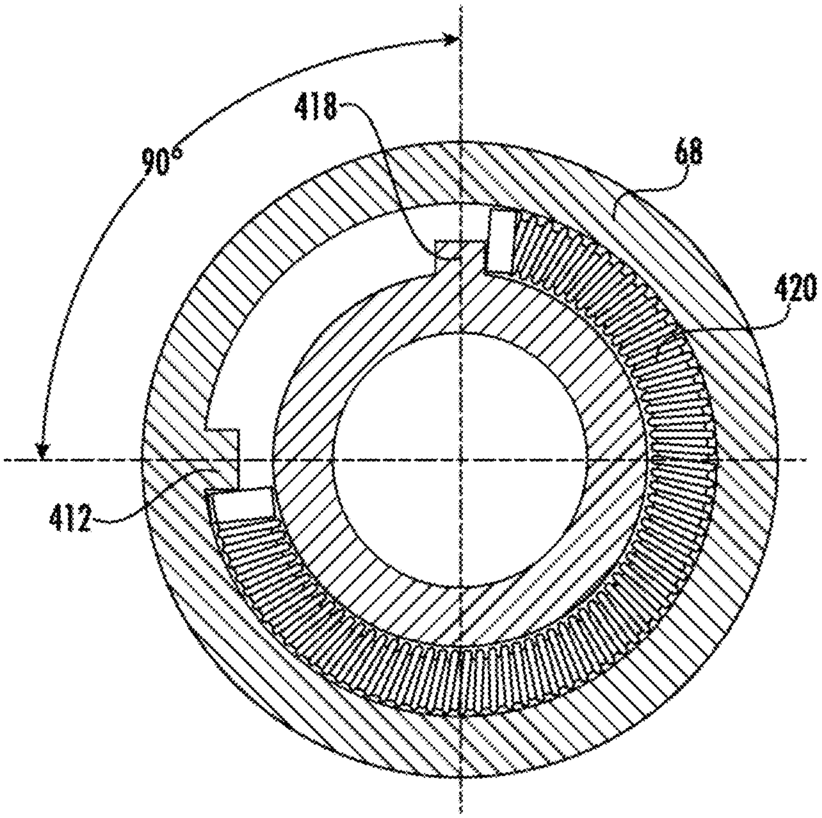
FIG. 30 is a cross-sectional view of the hook loop assembly of FIG. 26, in a second rotated position.

FIG. 30 illustrates the hub 68 rotated approximately 90 degrees counterclockwise from the home position. It can be seen that the spring 420 is compressed between the opposite side of the spring seat 412 and the spring stop 418.

The operation of the load break tool 32 is explained with reference to FIGS. 31-34.

Figure 31:
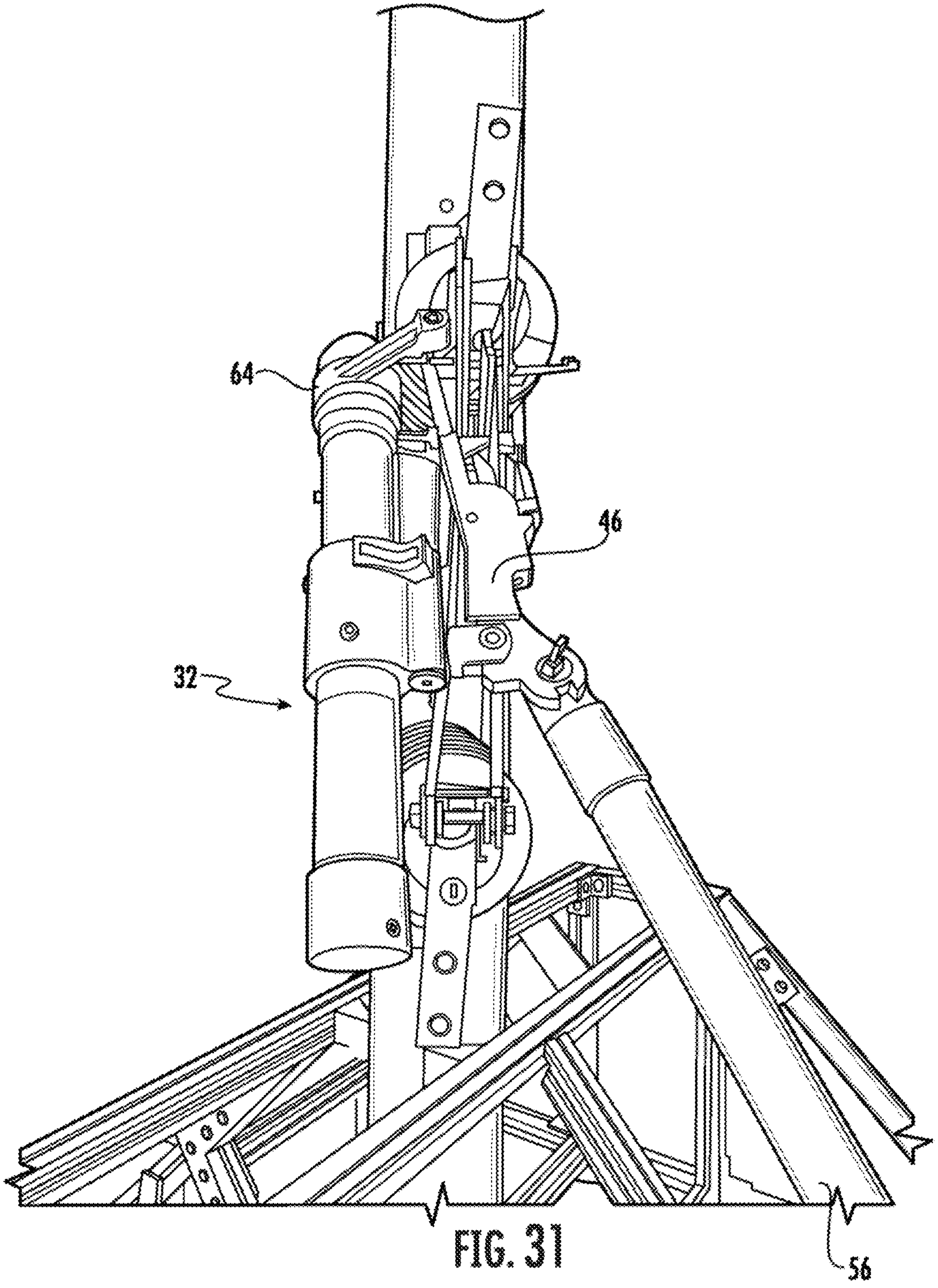
FIG. 31 is a perspective view of the load break tool of FIG. 3, engaged with a circuit isolating device, where both the load break tool and the circuit isolating device are in a closed position.

Referring to FIG. 31, starting with the load break tool 32 attached to a line pole 56 (e.g. insulated fiberglass stick) the operator initially lifts the load break tool 32 to an elevated position adjacent the circuit isolating device 10 while holding the lower end of the line pole 56, and the operator then swings the load break tool 32 into engagement with the isolating device 10 so as to bring the two terminals of the load break tool 32 into proper contact with the two conducting parts of the isolating device 10. The hook loop 64 of the load break tool 32 engages the arcing horn 25 of the circuit isolating device 10. The load break tool 32 is then swung laterally so that the clip assembly 46 of the load break tool 32 enters the pull ring 20 of the isolating device 10.

Figure 32:
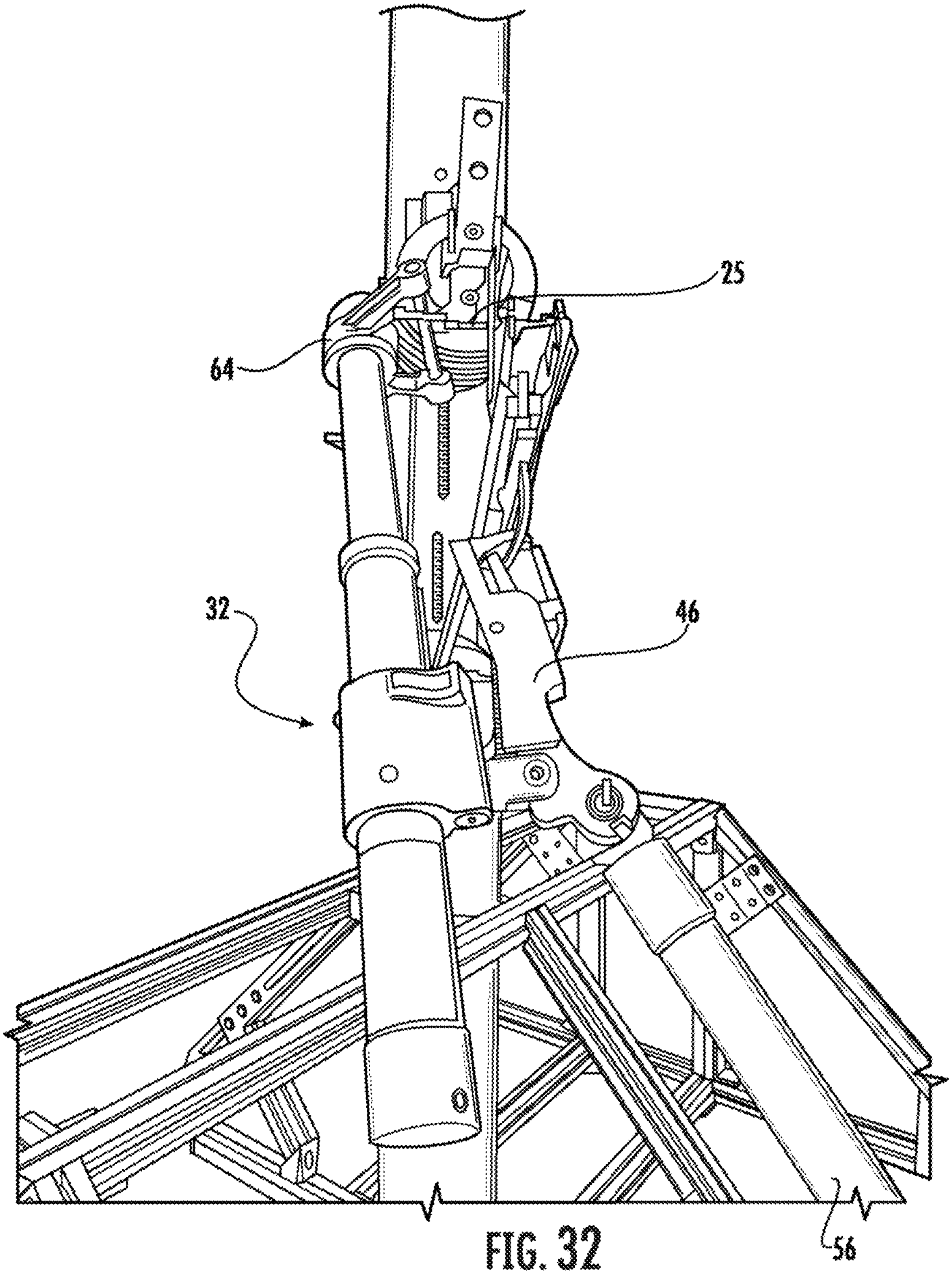
FIG. 32 is a perspective view of the load break tool of FIG. 3, engaged with the circuit isolating device, wherein both the load break tool and the circuit isolating device have been moved to a open position.

Referring to FIG. 32, the operator then pulls downwardly on the line pole 56, causing the pull ring 20 to move forwardly and separate the upper current carrying member 17 from the contact member 18. This separation breaks the circuit through the device 10 but the circuit remains closed by reason of the shunting circuit through the load break tool 32. Continued downward movement of the line pole 56 causes the sleeve 40 to axially extend from the main housing 34 against the biasing force of the spring 42. In response to the sleeve 40 being moved to and reaching its fully extended position, the shunting circuit apparatus 74 opens the shunt circuit so that electrical continuity between the clip assembly 46 and the hook loop 64 is broken. The resulting arc is confined to the interior of the load break tool 32.

Subsequently, the load break tool 32 is released from the circuit isolating device 10. This process is illustrated in FIGS. 33 and 34.

Figure 33:
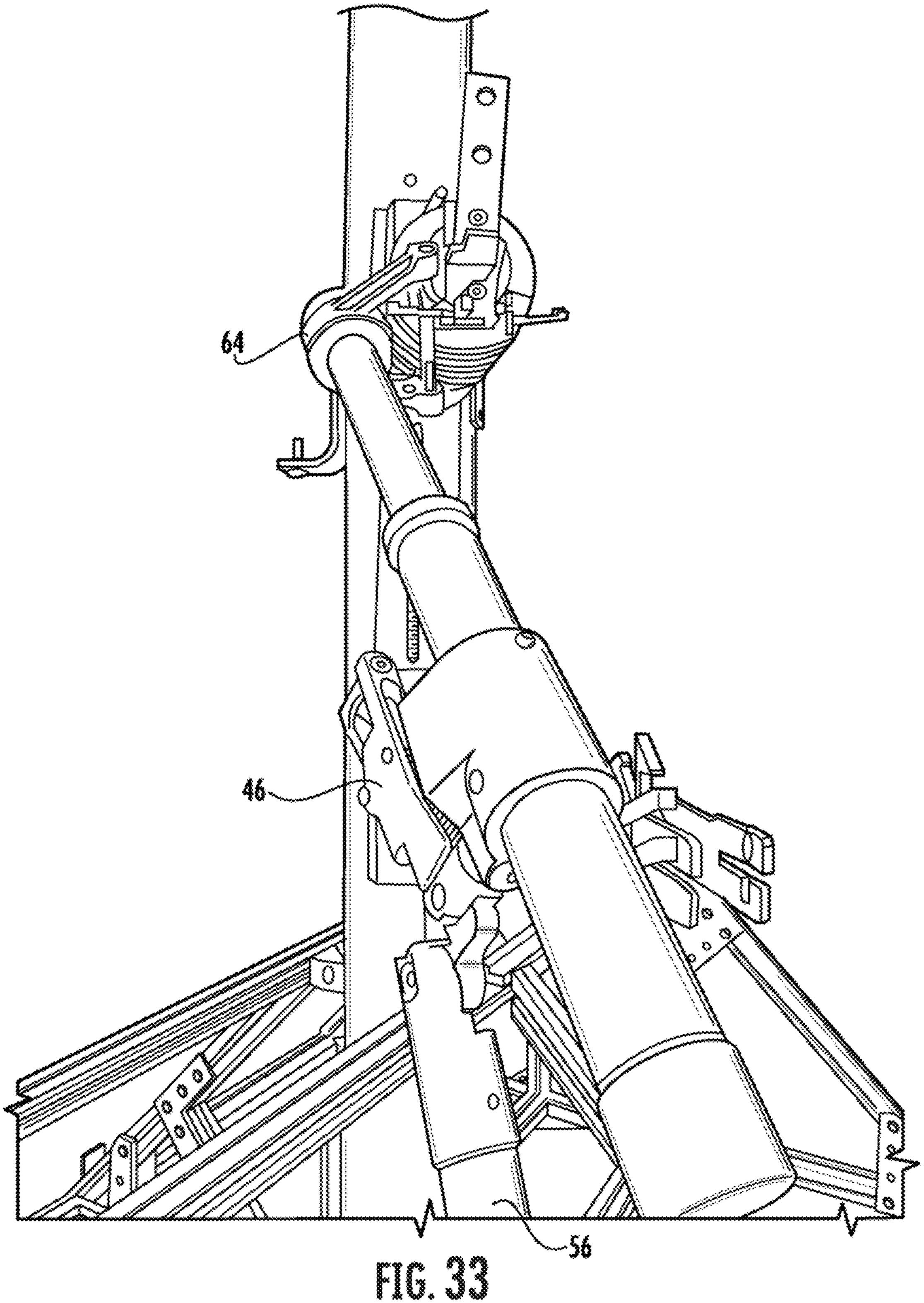
FIG. 33 is a perspective view of the load break tool of FIG. 3, wherein the load break tool has been rotated to release a clip apparatus thereof from the circuit isolating device, while a hook loop remains engaged to the circuit isolating device.

As shown in FIG. 33, the user maintains firm contact between the hook loop 64 and the arcing horn 25 (e.g., by applying slight downward pressure) and rotates or "rolls" the load break tool 32 inward towards the circuit isolating device 10 to disengage the clip assembly 46 from the pull ring 20.

During rotation, the hook loop 64 may have a tendency to "catch" on the circuit isolating device 10. If this happens, the hook loop 64 will rotate about axis A, as shown by the arrow in FIG. 33. This rotation will give the load break tool 32 the extra articulation needed to completely disengage the clip assembly 46 from the pull ring 20 while the hook loop 64 remains engaged with the circuit isolating device 10.

Figure 34:
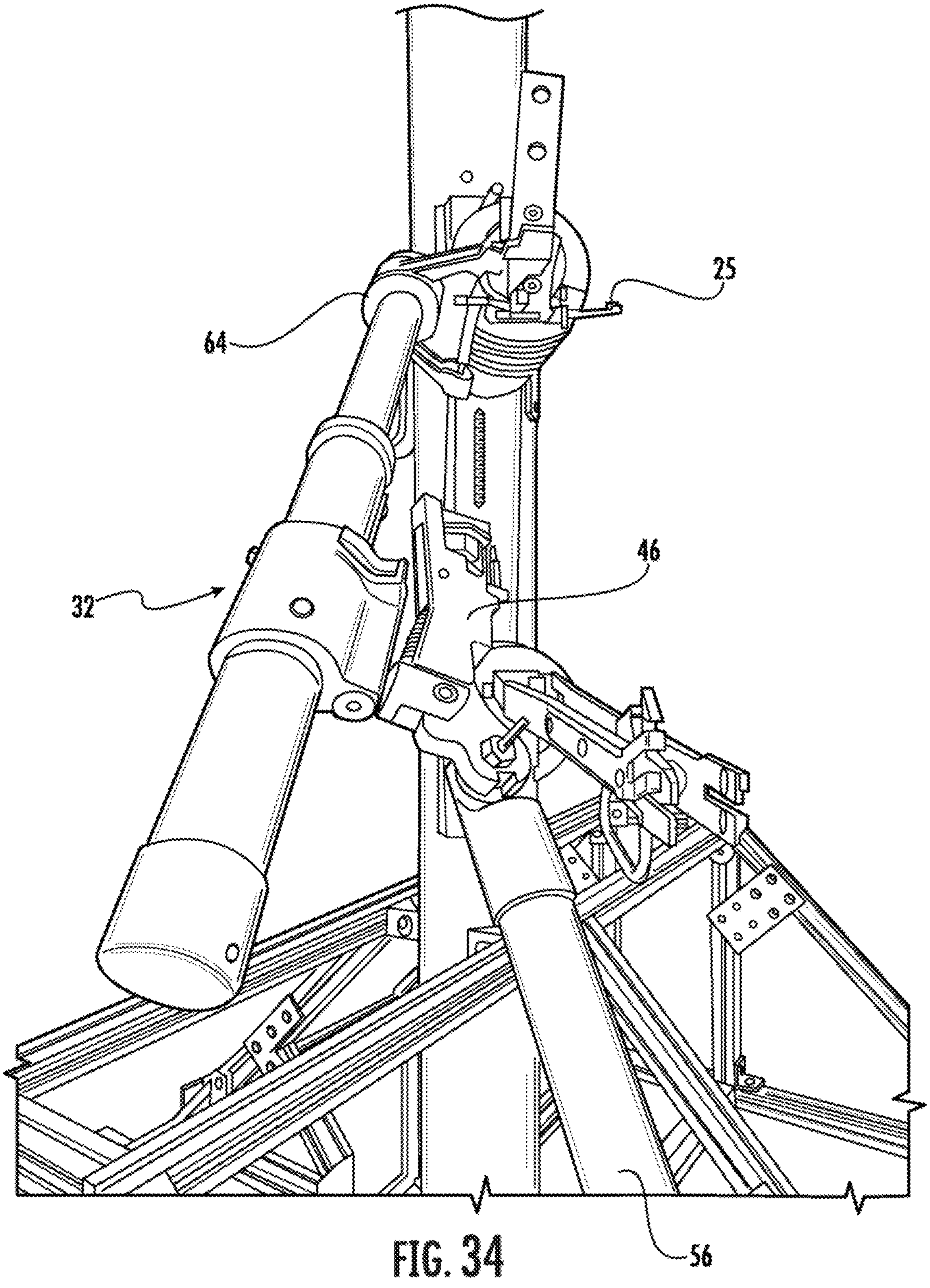
FIG. 34 is a perspective view of the load break tool of FIG. 3, fully disengaged from the circuit isolating device.

As shown in FIG. 34, upon release of the clip assembly 46, the fuse tube 16 of the circuit isolating device 10 will drop free of the load break tool 32. The load break tool 32 can then be lifted off of the circuit isolating device 10, disengaging the hook loop 64 from the arcing horn 25. As seen in FIG. 34, the restoring force of the internal springs will return the hook loop 64 to the home position described above. The load break tool 32 may then be reset to the closed position and is ready for another operation.

Figure 35:
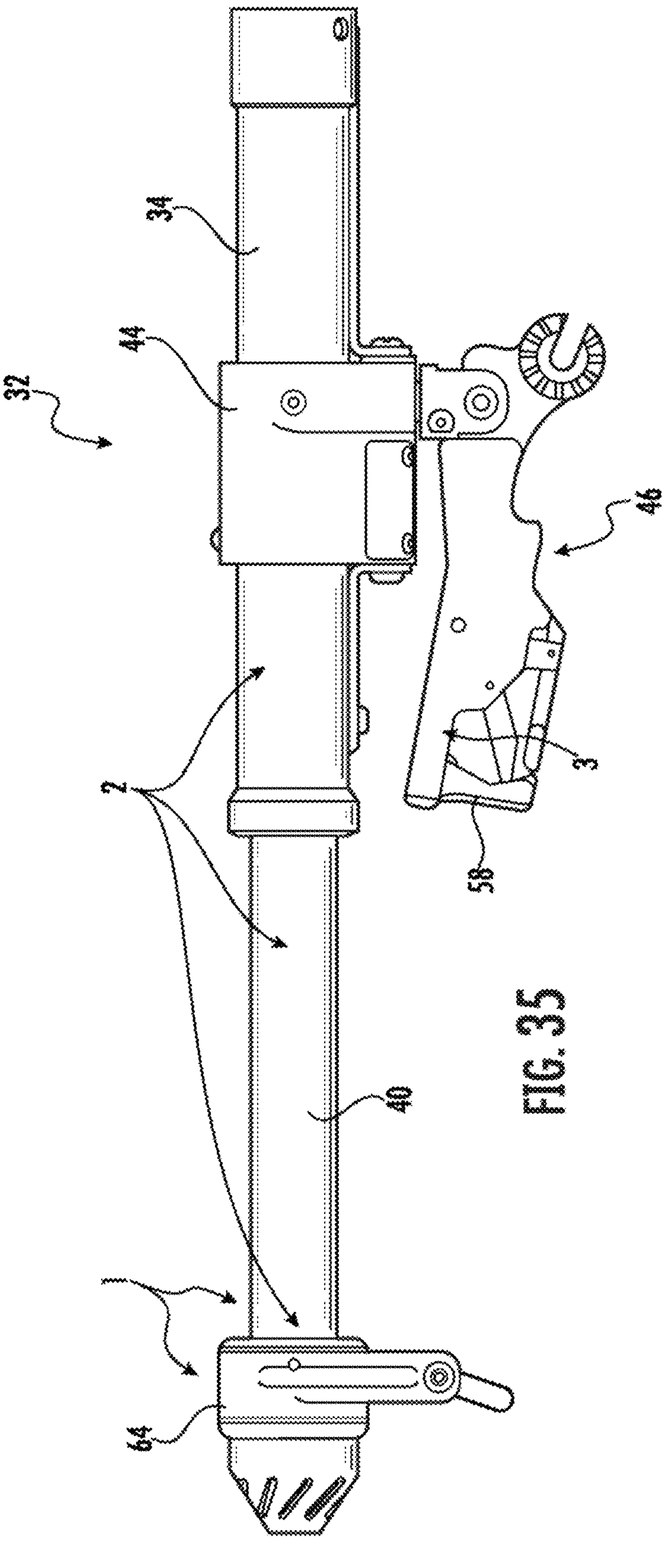
FIG. 35 is a schematic side view of an exemplary line break tool, showing possible options of rotational flexibility.

In the example embodiments described above, the hook loop 64 is rotatable relative to the remainder of the load break tool 32. It will be understood that an equivalent functional result (rotational flexibility) can be provided by enabling relative rotation between other components of the load break tool. Referring to FIG. 35 is a schematic side view of an exemplary line break tool, showing possible modes of rotation.

In one alternative, the hook loop 64 could be stationary relative to the sleeve 40. The hook loop 64 and sleeve 40 (arrow 1) may rotate relative to the main housing 34 and can 44.

In another alternative, the hook loop 64 could be stationary relative to the sleeve 40 and main housing 34. These three components (arrow 2) may rotate relative to the can 44.

In another alternative, the clip post 58 (arrow 3) could rotate relative to the body 48 of the clip assembly 46.

This flexible head hook amount described herein has the advantage and technical effect of providing a load break tool a greater range of motion for improved installation and removal on a cutout or switch before and after a load break operation is performed. Rotation of the hook about the fiberglass rod will provide an operator with more precise control during installation of the load break tool and prevent the tool from binding during the removal of the load break tool. This additional rotation of the hook mount during removal of the load break tool will permit a load break tool to reach in optimal position required to quickly and easily release the tool without binding or catching on a cutout or switch.

The foregoing has described a load break tool having a flexible hook loop mount and a method of its use. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

We claim:

1. A load break tool, comprising:
- a main housing;
- a clip assembly connected to the main housing for engaging a pull ring of a circuit isolating device; and
- a hook engaging terminal rotatably connected to a first end of a sleeve, such that the hook engaging terminal rotates relative to the clip assembly, the hook engaging terminal including a hub rotatably mounted to a hub mount, the hub including an interior bore and the hub mount including a cylindrical portion positioned inside of the interior bore.

2. The load break tool of claim 1, wherein the main housing is a tubular housing extending between a first end and a second end.

3. The load break tool of claim 1, wherein the clip assembly includes a main body extending between a proximal end and a distal end, the proximal end being connected to the main housing.

4. The load break tool of claim 3, wherein the proximal end includes a pole mount and the distal end includes clip post for engaging the pull ring of the circuit isolating device.

5. The load break tool of claim 1, wherein the hook engaging terminal includes first and second spaced-apart arms extending outwardly from the hub and an arcuate portion pivotally mounted between the first and second arms.

6. The load break tool of claim 1, wherein the hub mount is rigidly connected to the first end of the sleeve.

7. A load break tool, comprising:
- a tubular main housing extending between a first end and a second end;
- a sleeve having a first end and a second end, the sleeve being coaxially mounted in the main housing and slidable between a retracted position and an extended position, wherein the second end of the sleeve remains in the main housing proximate the first end of the main housing when in the extended position;
- a clip assembly connected to the main housing and including a clip post for engaging a pull ring of a circuit isolating device; and
- a hook engaging terminal rotatably connected to the first end of the sleeve, such that the hook engaging terminal rotates relative to the clip assembly, the hook engaging terminal including:
  - a hub rotatably mounted to a hub mount, the hub mount being rigidly connected to the first end of the sleeve, the hub including an interior bore and the hub mount including a cylindrical portion positioned inside of the interior bore,
  - first and second arms extending outwardly from the hub, and
  - an arcuate portion pivotally connected between the first and second arms.

8. The load break tool of claim 7, further including an internal shunt circuit assembly connected between the clip assembly and the hook engaging terminal.

9. The load break tool of claim 7, wherein the hook engaging terminal rotates ninety degrees clockwise and ninety degrees counter-clockwise.

10. The load break tool of claim 7, wherein the interior bore includes at least one spring seat and the cylindrical portion includes at least one spring stop.

11. The load break tool of claim 10, further including at least one spring extending between the at least one spring seat and the at least one spring stop.

12. A load break tool, comprising:

a tubular main housing extending between a first end and a second end;

a sleeve having a first end and a second end, the sleeve being coaxially mounted in the main housing and slidable between a retracted position and an extended position;

a clip assembly connected to the main housing and including a clip post for engaging a pull ring of a circuit isolating device;

a hook engaging terminal rotatably connected to the sleeve, such that the hook engaging terminal rotates relative to the clip assembly, the hook engaging terminal including a hub having an interior bore, first and second arms extending outwardly from the hub, and an arcuate portion pivotally connected between the first and second arms; and a hub mount connected to the first end of the sleeve, the hub being rotatably connected to the hub mount such that a cylindrical portion of the hub mount is positioned inside of the interior bore of the hub.

13. The load break tool of claim 12, wherein the interior bore includes at least one spring seat and the cylindrical portion includes at least one spring stop.

14. The load break tool of claim 13, wherein a spring extends between the at least one spring seat and at least one spring stop.

15. The load break tool of claim 12, wherein the interior bore includes first and second spring seats and the cylindrical portion includes a spring stop.

16. The load break tool of claim 15, wherein a first spring extends between the first spring seat and the spring stop and a second spring extends between the second spring seat and the spring stop.

17. The load break tool of claim 12, wherein the interior bore includes first and second spring seats, and wherein a torsion spring is fixed to the cylindrical portion, the torsion spring including a first arm extending between the first spring seat and the cylindrical portion and a second arm extending between the second spring seat and the cylindrical portion.

18. The load break tool of claim 12, wherein the cylindrical portion includes a spring carrier, and wherein a first spring is disposed in the first arm and extends between a distal end of the first arm and the spring carrier and a second spring is disposed in the second arm and extends between a distal end of the second arm and the spring carrier.

* * * * *